(12) United States Patent
Tomoda et al.

(10) Patent No.: US 8,220,263 B2
(45) Date of Patent: Jul. 17, 2012

(54) CONTROL APPARATUS FOR INTERNAL COMBUSTION ENGINE

(75) Inventors: Terutoshi Tomoda, Mishima (JP);
Shinobu Ishiyama, Numazu (JP);
Tomoyuki Ono, Sunto-gun (JP);
Koichiro Nakatani, Mishima (JP);
Tomoyuki Kogo, Gotenba (JP);
Katsuhiro Ito, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 289 days.

(21) Appl. No.: 12/682,838

(22) PCT Filed: Nov. 10, 2008

(86) PCT No.: PCT/JP2008/070426
§ 371 (c)(1),
(2), (4) Date: Apr. 13, 2010

(87) PCT Pub. No.: WO2009/063831
PCT Pub. Date: May 22, 2009

(65) Prior Publication Data
US 2010/0242471 A1 Sep. 30, 2010

(30) Foreign Application Priority Data

Nov. 13, 2007 (JP) ................ 2007-294655
Jul. 1, 2008 (JP) ................ 2008-172550

(51) Int. Cl.
*F02D 23/00* (2006.01)
*F01L 1/34* (2006.01)
(52) U.S. Cl. ........................ 60/602; 123/90.15

(58) Field of Classification Search ............ 123/90.15; 60/602
See application file for complete search history.

(56) References Cited

U.S. PATENT DOCUMENTS

| 5,819,693 | A | 10/1998 | Curtil | |
|---|---|---|---|---|
| 6,772,742 | B2 * | 8/2004 | Lei et al. | 123/568.14 |
| 7,134,420 | B2 * | 11/2006 | Miyashita | 123/299 |
| 7,415,966 | B2 * | 8/2008 | Irisawa | 123/431 |
| 7,458,346 | B2 * | 12/2008 | Gibson | 123/90.15 |
| 7,461,504 | B2 * | 12/2008 | Warner et al. | 60/286 |
| 7,487,750 | B2 * | 2/2009 | Leone et al. | 123/90.15 |
| 7,607,416 | B2 * | 10/2009 | Sato | 123/406.24 |
| 7,644,586 | B2 * | 1/2010 | Yamagata | 60/612 |

(Continued)

FOREIGN PATENT DOCUMENTS
JP A 6-173723 6/1994
(Continued)

OTHER PUBLICATIONS

Tomoda at al., "Improvement of Diesel Engine Performance by Variable Valve Train System," Internationales Wiener Motorensymposium, 2009, vol. 30.

(Continued)

*Primary Examiner* — Thomas Denion
*Assistant Examiner* — Cameron Setayesh
(74) *Attorney, Agent, or Firm* — Oliff & Berridge, PLC

(57) ABSTRACT

A control apparatus for an internal combustion engine, which can generate exhaust pressure pulsation at an early period while suppressing the degradation of volumetric efficiency, when a request to enhance the exhaust pressure pulsation is made in the internal combustion engine which includes a variable valve mechanism that makes variable a valve overlap period, and a variable nozzle type turbocharger.

16 Claims, 13 Drawing Sheets

U.S. PATENT DOCUMENTS

| | | | |
|---|---|---|---|
| 7,707,988 B2 * | 5/2010 | Irisawa | 123/299 |
| 7,921,944 B2 * | 4/2011 | Russell et al. | 180/65.265 |
| 2003/0164163 A1 * | 9/2003 | Lei et al. | 123/568.14 |

FOREIGN PATENT DOCUMENTS

| | | |
|---|---|---|
| JP | A 9-505654 | 6/1997 |
| JP | A 10-176558 | 6/1998 |
| JP | A 11-022499 | 1/1999 |
| JP | A 11-082074 | 3/1999 |
| JP | A 11-141375 | 5/1999 |
| JP | A 2001-003757 | 1/2001 |
| JP | A 2003-003871 | 1/2003 |
| JP | A 2003-097252 | 4/2003 |
| JP | A 2004-137982 | 5/2004 |
| JP | A 2004-190514 | 7/2004 |
| JP | A 2004-204745 | 7/2004 |
| JP | A 2006-132410 | 5/2006 |
| JP | A 2007-100607 | 4/2007 |
| JP | A 2008-008226 | 1/2008 |
| JP | A 2008-215327 | 9/2008 |

OTHER PUBLICATIONS

International Search Report issued in International Application No. PCT/JP2008/073682; mailed Dec. 26, 2008. (with English-language translation).

International Search Report issued in corresponding International Application No. PCT/JP2008/070426, mailed Dec. 9, 2008. (with English-language translation).

* cited by examiner

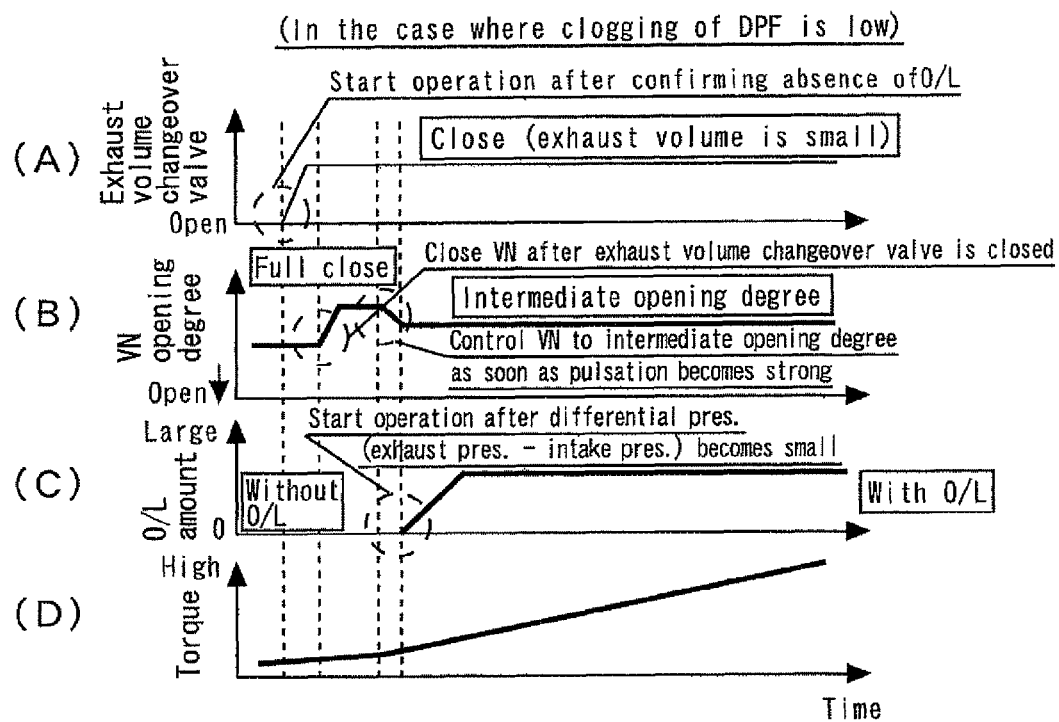
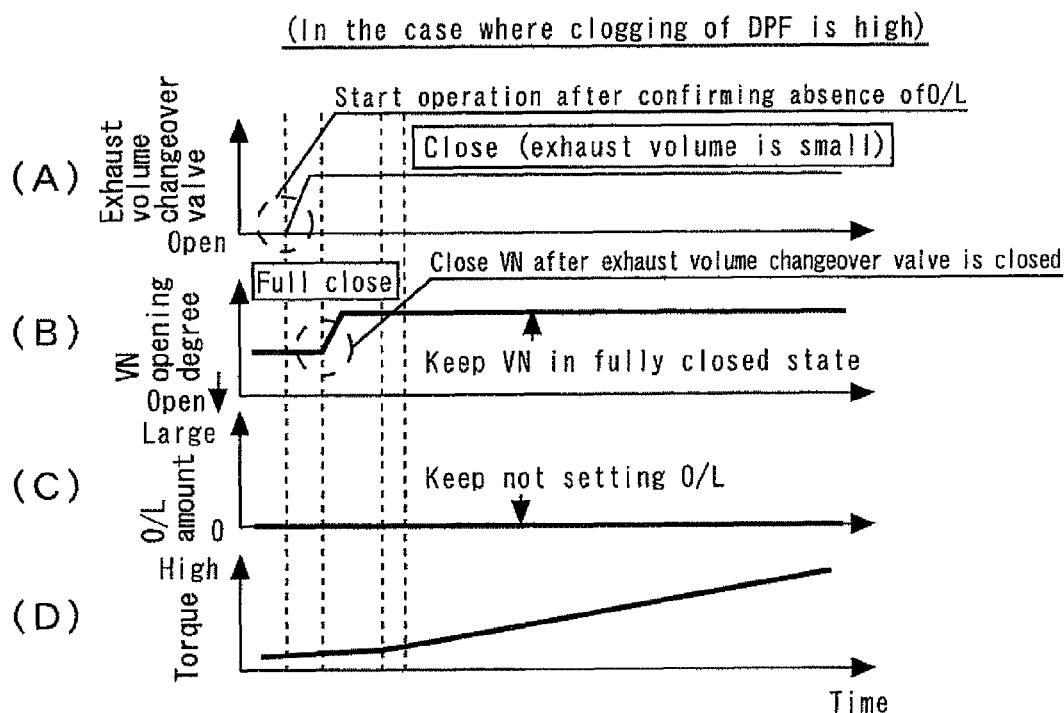

CONTROL APPARATUS FOR INTERNAL COMBUSTION ENGINE

TECHNICAL FIELD

The present invention relates to a control apparatus for an internal combustion engine.

BACKGROUND ART

So far, for example, Patent Document 1 discloses a valve timing control apparatus of an internal combustion engine which includes a variable valve mechanism that makes changeable a valve overlap period, during which an intake valve open period overlaps with an exhaust valve open period, by changing the valve timing of at least one of the intake and exhaust valves. In this conventional control apparatus, arrangement is made such that the valve timing of intake and exhaust valve is changed such that an exhaust-port arrival timing of a negative pressure wave caused by exhaust pressure pulsation coincides with the valve overlap period of the intake and exhaust valves. According to such control, it becomes possible to make fresh air easily flow into a cylinder from the intake valve and to expel the burnt gas in the cylinder securely using the air that flowed in through the intake valve. That is, a scavenging effect can be achieved. As a result, the quantity of residual gas is reduced and the quantity of fresh air to be taken into a cylinder can be increased. That is, volumetric efficiency can be improved.

Including the above-mentioned document, the applicant is aware of the following documents as a related art of the present invention.
[Patent Document 1] Japanese Laid-open Patent Application Publication No. H11-022499
[Patent Document 2] Japanese Laid-open Patent Application Publication No. H10-176558
[Patent Document 3] Japanese Laid-open Patent Application Publication No. H11-082074
[Patent Document 4] Japanese Laid-open Patent Application Publication No. 2004-137982
[Patent Document 5] Japanese Laid-open Patent Application Publication No. 2007-100607

DISCLOSURE OF INVENTION

Problem to be Solved by the Invention

There is a known internal combustion engine which includes a variable nozzle type turbocharger as well as a variable valve mechanism such as one included in the above-described conventional internal combustion engine. In a situation in which the quantity of intake air is rather small, such as in an initial period of acceleration of a vehicle, a relatively weak exhaust pressure pulsation is generated. Therefore, in the internal combustion engine including the variable nozzle type turbocharger as well as the variable valve mechanism as described above; when the generation of a strong exhaust pressure pulsation is required, one possible idea would be to control the opening degree of the variable nozzle toward the closing side such as a fully closed position to increase the quantity of intake air. However, if the above-described adjustment of the valve overlap period, which aims to utilize the exhaust pressure pulsation, is performed when the variable nozzle is controlled toward the closing side under the condition of a weak exhaust pressure pulsation, it cannot be avoided that the opening degree control of the variable nozzle leads to an increase in exhaust pressure, thereby making it harder to achieve the scavenging effect, and the provision of the valve overlap period results in a blow-back of exhaust gas toward the intake side, thereby degrading volumetric efficiency.

The present invention, which has been made to solve the problem as described above, has an object to provide a control apparatus for an internal combustion engine, which can generate exhaust pressure pulsation at an early period while suppressing the degradation of volumetric efficiency, when a request for the enhancement of the exhaust pressure pulsation is made in the internal combustion engine which includes a variable valve mechanism which makes a valve overlap period changeable, and a variable nozzle type turbocharger.

Means for Solving the Problem

A first aspect of the present invention is a control apparatus for an internal combustion engine, the apparatus comprising:
a variable valve mechanism which makes variable a valve overlap period, in which an intake valve opening period overlaps with an exhaust valve opening period;
overlap period control means for controlling the variable valve mechanism to control the valve overlap period;
a turbocharger which includes a turbine driven by exhaust energy of the internal combustion engine, and a variable nozzle for adjusting a flow rate of exhaust gas supplied to the turbine;
nozzle opening degree control means for controlling an opening degree of the variable nozzle; and
pulsation generation request detecting means for detecting existence of nonexistence of a request to enhance exhaust pressure pulsation,
wherein the nozzle opening degree control means includes nozzle closing control execution means for controlling the opening degree of the variable nozzle so as to be a first predetermined opening degree, which is on a closing side with respect to the opening degree of the variable nozzle at a detection time point at which the request to enhance exhaust pressure pulsation is detected, for a duration from the detection time point to a judgment time point at which the exhaust pressure pulsation is judged to have been enhanced, and
wherein the overlap period control means includes overlap period restricting means for controlling the valve overlap period in such a way as to be shorten than the valve overlap period at the detection time point, for the duration from the detection time point to the judgment time point.

A second aspect of the present invention is the control apparatus for the internal combustion engine according to the first aspect of the present invention,
wherein the overlap period restricting means restricts the valve overlap period to be zero or substantially zero for the duration from the detection time point to the judgment time point.

A third aspect of the present invention is the control apparatus for the internal combustion engine according to the first or second aspect of the present invention,
wherein the nozzle opening degree control means further includes nozzle opening control execution means for controlling the opening degree of the variable nozzle to be a second predetermined opening degree which is on an opening side with respect to the first predetermined opening degree, after the determination time point is passed, and
wherein the overlap period control means further includes overlap period setting means for setting the valve overlap period in such a way as to overlap with a timing at which trough of the exhaust pressure pulsation comes after the judgment time point is passed.

A fourth aspect of the present invention is the control apparatus for the internal combustion engine according to the third aspect of the present invention, wherein the overlap period setting means sets the valve overlap period in such a way as to overlap with the timing at which the trough of the exhaust pressure pulsation comes, after the nozzle opening control execution means controls the opening degree of the variable nozzle to be the second predetermined opening degree.

A fifth aspect of the present invention is the control apparatus for the internal combustion engine according to the third or fourth aspect of the present invention, wherein the overlap period setting means adjusts the valve overlap period which is set after the judgment time point is passed, in accordance with a change in the opening degree of the variable nozzle caused by the nozzle opening control execution means.

A sixth aspect of the present invention is the control apparatus for the internal combustion engine according to the first or second aspect of the present invention, wherein the nozzle opening degree control means further includes high efficiency opening degree setting means for, after the judgment time point is passed, controlling the opening degree of the variable nozzle to be a high efficiency opening degree at which turbocharger efficiency of the turbocharger is higher than that at the detection time point, and wherein the overlap period control means further includes overlap period setting means for setting the valve overlap period in such a way as to overlap with a timing at which trough of the exhaust pressure pulsation comes, after the judgment time point is passed.

A seventh aspect of the present invention is the control apparatus for the internal combustion engine according to the sixth aspect of the present invention, wherein the overlap period setting means sets the valve overlap period in such a way as to overlap with the timing at which the trough of the exhaust pressure pulsation comes, after the high efficiency opening degree setting means controls the opening degree of the variable nozzle to be the high efficiency opening degree.

An eighth aspect of the present invention is the control apparatus for the internal combustion engine according to the sixth or seventh aspect of the present invention, wherein the overlap period setting means adjusts the valve overlap period which is set after the judgment time point is passed, in accordance with a change in the opening degree of the variable nozzle caused by the high efficiency opening degree setting means.

A ninth aspect of the present invention is the control apparatus for the internal combustion engine according to any one of the third to eighth aspects of the present invention, wherein the variable valve mechanism includes an intake variable valve mechanism which makes variable an opening timing of an intake valve, and an exhaust variable valve mechanism which makes variable a closing timing of an exhaust valve, and wherein the overlap period setting means further includes control amount ratio setting means for, when the valve overlap period is set in such a way as to overlap with the timing at which the trough of the exhaust pressure pulsation comes after the judgment time point is passed, setting a ratio between respective control amounts of an advance-angle amount of the opening timing of the intake valve and a retard-angle amount of the closing timing of the exhaust valve, based on a phase at which the trough of the exhaust pressure pulsation comes.

A tenth aspect of the present invention is the control apparatus for the internal combustion engine according to any one of the third to ninth aspects of the present invention, wherein the variable valve mechanism includes an intake variable valve mechanism which makes variable an opening timing of an intake valve, and an exhaust variable valve mechanism which makes variable a closing timing of an exhaust valve, and wherein the overlap period setting means further includes control start order setting means for, when the valve overlap period is set in such a way as to overlap with the timing at which the trough of the exhaust pressure pulsation comes after the judgment time point is passed, setting a start order of an advance-angle control of the opening timing of the intake valve and a retard-angle control of the closing timing of the exhaust valve, based on a phase at which the trough of the exhaust pressure pulsation comes.

An eleventh aspect of the present invention is the control apparatus for the internal combustion engine according to any one of the third to tenth aspects of the present invention, the apparatus further comprising:

pressure intersection information acquisition means for acquiring at least one intersection of a crank angle at a first intersection where an exhaust pressure intersects with an intake pressure in such a way that the exhaust pressure falls below the intake pressure near an exhaust top dead center, and a crank angle at a second intersection where the exhaust pressure intersects with the intake pressure in such a way that the exhaust pressure exceeds the intake pressure at the exhaust top dead center, wherein the valve overlap period setting means further includes valve opening/closing timing adjusting means for controlling the opening timing of the intake valve and/or the closing timing of the exhaust valve in such a way that the opening timing of the intake valve becomes the crank angle at the first intersection and/or in such a way that the closing timing of the exhaust valve becomes the crank angle at the second intersection.

A twelfth aspect of the present invention is the control apparatus for the internal combustion engine according to the first or second aspect of the present invention, the apparatus further comprising:

clogging determining means for determining degree of clogging of an exhaust gas purifying apparatus disposed in an exhaust passage; and control changing means for, in accordance with the degree of clogging of the exhaust gas purifying apparatus determined by the clogging determining means, changing an opening degree control of the variable nozzle and a control of the valve overlap period after the judgment time point is passed.

A thirteenth aspect of the present invention is the control apparatus for the internal combustion engine according to the twelfth aspect of the present invention, wherein the control changing means includes low-clogging-case nozzle opening control execution means for, if the clogging determining means determines that the degree of clogging of the exhaust gas purifying apparatus is low, controlling the opening degree of the variable nozzle to be a second predetermined opening degree which is an opening side with respect to the first predetermined opening degree after the judgment time point is passed, and low-clogging-case overlap period setting means for, if the clogging determining means determines that the degree of clogging of the exhaust gas purifying apparatus is low, setting the valve overlap period in such a way as to overlap with a timing at which trough of the exhaust pressure pulsation comes after the judgment time point is passed.

A fourteenth aspect of the present invention is the control apparatus for the internal combustion engine according to the twelfth or thirteenth aspect of the present invention, the apparatus further comprising:

exhaust system volume variable means which makes variable an exhaust system volume that is a volume obtained as a sum of an exhaust manifold volume and a space communicated therewith, wherein, if the clogging determining means determines that the degree of clogging of the exhaust gas purifying apparatus is low, the exhaust system volume variable means reduces the exhaust system volume after the judgment time point is passed.

A fifteenth aspect of the present invention is the control apparatus for the internal combustion engine according to the twelfth aspect of the present invention, wherein the request to enhance exhaust pressure pulsation is an acceleration request, and wherein the control changing means includes high-clogging-case control means for controlling the opening degree of the variable nozzle and the valve overlap period in such a way that the control of the variable nozzle opening degree and valve overlap period is kept performed during acceleration, if the clogging determining means determines that the degree of clogging of the exhaust gas purifying apparatus is high.

A sixteenth aspect of the present invention is the control apparatus for the internal combustion engine according to the fifteenth aspect of the present invention, the apparatus further comprising:

exhaust system volume variable means which makes variable an exhaust system volume that is a volume obtained as a sum of an exhaust manifold volume and a space communicated therewith, wherein, if the clogging determining means determines that the degree of clogging of the exhaust gas purifying apparatus is high, the exhaust system volume variable means reduces the exhaust system volume after the judgment time point is passed.

Advantages of the Invention

According to the first aspect of the present invention, when a request for the enhancement of exhaust pressure pulsation is made, an increase in the quantity of intake air can be promoted by controlling the opening degree of the variable nozzle toward the closing side, thereby enhancing the exhaust pressure pulsation at an early period. Further, according to the present invention, when the request is made, a blow-back of exhaust gas to the intake side can be well prevented by controlling the valve overlap period to be shorter. Thus, according to the present invention, it is possible to generate exhaust pressure pulsation at an early period while suppressing the degradation of the volumetric efficiency.

According to the second aspect of the present invention, it is possible to generate exhaust pressure pulsation at an early period while suppressing a blow-back of exhaust gas to the intake side securely when the request for the enhancement of exhaust pressure pulsation is made.

According to the third aspect of the present invention, after the time point at which the exhaust pressure pulsation is judged to have been enhanced is passed, the exhaust pressure can be decreased relative to the intake pressure (boost pressure) by controlling the opening degree of the variable nozzle to an opening side. Therefore, in a case in which the above-described request is an acceleration request, it becomes possible to sufficiently utilize the scavenging effect by using the exhaust pressure pulsation well enhanced.

According to the fourth aspect of the present invention, it becomes possible to provide a valve overlap period after an area in which the intake pressure is higher with respect to the exhaust pressure at near the exhaust top dead center is securely ensured. This makes it possible to sufficiently utilize the scavenging effect while avoiding the occurrence of a blow-back of exhaust gas to the intake side.

According to the fifth aspect of the present invention, since the valve overlap period is adjusted in accordance with the opening degree of the variable nozzle which is an influencing factor that defines the degree with which the intake pressure is higher with respect to the exhaust pressure at a timing when the trough of the exhaust pressure pulsation comes, it becomes possible to set the valve overlap period so as to certainly overlap with a timing when the trough of the exhaust pressure pulsation comes. This makes it possible to preferably prevent the degradation of the volumetric efficiency caused by a blow-back of the exhaust gas to the intake side.

According to the sixth aspect of the present invention, after the time point at which the exhaust pressure pulsation is judged to have been enhanced is passed, the exhaust pressure can be preferably decreased relative to the intake pressure (boost pressure) by controlling the opening degree of the variable nozzle to a high efficiency opening degree with a high turbo efficiency. Therefore, in a case in which the above-described request is an acceleration request, it becomes possible to sufficiently utilize the scavenging effect by using the exhaust pressure pulsation well enhanced.

According to the seventh aspect of the present invention, it becomes possible to provide a valve overlap period after an area in which the intake pressure is higher with respect to the exhaust pressure at near the exhaust top dead center is securely ensured. This makes it possible to sufficiently utilize the scavenging effect while avoiding the occurrence of a blow-back of exhaust gas to the intake side.

According to the eighth aspect of the present invention, since the valve overlap period is adjusted in accordance with the opening degree of the variable nozzle which is an influencing factor that defines the degree with which the intake pressure is higher with respect to the exhaust pressure at a timing when the trough of the exhaust pressure pulsation comes, it becomes possible to set the valve overlap period so as to certainly overlap with a timing when the trough of the exhaust pressure pulsation comes. This makes it possible to preferably prevent the degradation of the volumetric efficiency caused by a blow-back of the exhaust gas to the intake side.

According to the ninth aspect of the present invention, the area in which the exhaust pressure is higher than the intake pressure (an area in which the above-described blow-back is concerned) can be excluded from the valve overlap period when enlarging the valve overlap period. This makes it possible to sufficiently obtain the scavenging effect.

According to the tenth aspect of the present invention, when the area in which the intake pressure is higher than the exhaust pressure as a result of the opening degree of the variable nozzle being opened comes to appear, the valve overlap period becomes possible to promptly overlap with a portion where the above-described area comes to appear in first. This makes it possible to sufficiently obtain the scavenging effect.

According to the eleventh aspect of the present invention, it becomes possible to set the valve overlap period so as to fully coincide with a timing at which the intake pressure is higher with respect to the exhaust pressure. Therefore, it becomes possible to obtain the scavenge effect while securely preventing the degradation of the volumetric efficiency caused by a blow-back of the exhaust gas to the intake side.

When the degree of clogging of the exhaust purifying apparatus is high, the back pressure becomes high. Since, as a result, the area in which the intake pressure is higher than the exhaust pressure in the valve overlap period becomes small, a sufficient scavenging effect is hard to be acquired. According to the twelfth aspect of the present invention, it becomes possible to appropriately specify the opening degree control of the variable nozzle and the control of the valve overlap period based on the clogging state of the exhaust purifying apparatus so that the exhaust pressure pulsation can be utilized effectively.

According to the thirteenth aspect of the present invention, in the case in which the degree of clogging of the exhaust purifying apparatus is low, after the above-described judgment time point is passed, the exhaust pressure can be decreased relative to the intake pressure (boost pressure) by controlling the opening degree of the variable nozzle to an opening side. This makes it possible to sufficiently utilize the scavenging effect by using the exhaust pressure pulsation well enhanced.

According to the fourteenth aspect of the present invention, it becomes possible to effectively enhance the exhaust pressure pulsation.

According to the fifteenth aspect of the present invention, in the case in which the degree of clogging of the exhaust purifying apparatus is high, after the above-described judgment time point is passed, an arrangement is made such that the opening degree of the variable nozzle and valve overlap period before the judgment time point are kept, thereby enhancing the boost pressure so as to effectively increase the torque of the internal combustion engine in a situation in which an effective scavenging effect cannot be expected.

According to the sixth aspect of the present invention, since the exhaust pressure (back pressure) becomes high, the turbo rotational speed increases, thereby effectively enhancing the boost pressure.

BRIEF DESCRIPTION OF DRAWINGS

FIG. 17 is a time chart showing an example of the operation at the time of acceleration implemented by the processes of the routine shown FIG. 16 (in a case in which degree of clogging of a DPF is relatively low); and FIG. 18 is a time chart showing an example of the operation at the time of acceleration implemented by the processes of the routine shown FIG. 16 (in a case in which degree of clogging of a DPF is relatively high).

Figure 1:
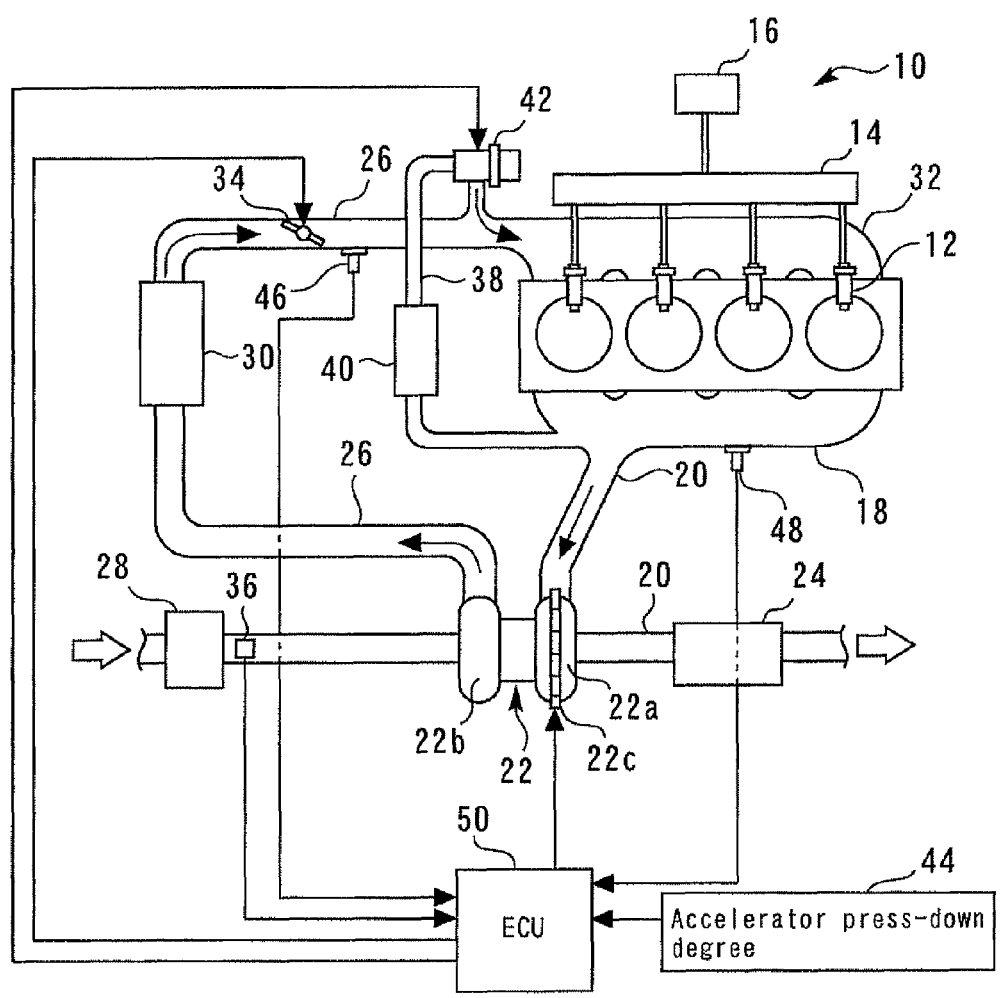
FIG. 1 is a diagram for explaining the system configuration according to a first embodiment of the present invention.

DESCRIPTION OF SYMBOLS 10 diesel engine
18 exhaust manifold
20 exhaust passage
22 variable nozzle type turbocharger
22a turbine
22b compressor
22c variable nozzle (VN)
26 intake passage
32 intake manifold
38 EGR passage
40 EGR cooler
42 EGR valve
44 accelerator press-down degree sensor
46 intake pressure sensor
48 exhaust pressure sensor
50, 84 ECU (Electronic Control Unit)
62 crank angle sensor
64 intake valve
66 intake variable valve mechanism
68 exhaust valve
70 exhaust variable valve mechanism
72 intake cam angle sensor
74 exhaust cam angle sensor
80 exhaust volume changeover valve
82 differential pressure sensor

BEST MODE FOR CARRYING OUT THE INVENTION

First Embodiment
[System Configuration of First Embodiment]

FIG. 1 is a diagram for explaining the system configuration according to a first embodiment of the present invention. The system shown in FIG. 1 includes a four-stroke diesel engine (compression ignition internal combustion engine) 10. It is assumed that the diesel engine 10 is mounted in a vehicle and used as a source of power for the vehicle. Although, the diesel engine 10 according to the present embodiment is of an inline four-cylinder type, the number of cylinders and the arrangement of the cylinders in the diesel engine in the present invention are not limited to the above.

An injector 12 directly injecting a fuel into the cylinder is installed in each cylinder of the diesel engine 10. The injector 12 of each cylinder is connected to a common common-rail 14. A high pressure fuel which is pressurized by a supply pump 16 is pooled in the common-rail 14. The fuel from the common-rail 14 is supplied to the injector 12 of each cylinder. The exhaust gas discharged from each cylinder is gathered by an exhaust manifold 18 to flow into an exhaust passage 20.

The diesel engine 10 is provided with a variable nozzle type turbocharger 22. The turbocharger 22 includes a turbine 22a which is operated by the exhaust energy of exhaust gas, and a compressor 22b which is integrally coupled to the turbine 22a and is rotated by the exhaust energy of the exhaust gas that enters the turbine 22a. Further, the turbocharger 22 has a variable nozzle (VN) 22c for adjusting the flow rate of the exhaust gas supplied to the turbine 22a.

The variable nozzle 22c is configured so as to be capable of being opened and closed by an actuator (for example, an electric motor) which is not shown. The inlet area of the turbine 22a decreases as the opening degree of the variable nozzle 22c decreases, and thus the flow speed of the exhaust gas blown onto the turbine 22a can be increased. As a result, the boost pressure can be risen since the rotational speed of the compressor 22b and turbine 22a (hereinafter, referred to as a "turbo rotational speed") increases. In contrast, the inlet area of the turbine 22a increases as the opening degree of the variable nozzle 22c increases, and thus the flow speed of the exhaust gas blown onto the turbine 22a can be slower. As a result, the boost pressure can be reduced since the turbo rotational speed decreases.

The turbine 22a of the turbocharger 22 is disposed at some point in the exhaust passage 20. A DPF 24 for trapping Particulate Matter (PM) in the exhaust gas is installed at a downstream side of the turbine 22a in the exhaust passage 20. Note that besides the DPF 24, a catalyst for purifying hazardous components contained in the exhaust gas may be installed in the exhaust passage 20. Alternatively, catalytic components may be supported by the DPF 24.

An air cleaner 28 is installed in the vicinity of the inlet of an intake passage 26 of the diesel engine 10. The air taken through the air cleaner 28 is compressed by the compressor 22b of the turbocharger 22 and thereafter is cooled by an intercooler 30. The intake air which has passed through the intercooler 30 is distributed by an intake manifold 32 to thereby flow into each cylinder.

An intake throttle valve 24 is installed in the intake passage 26 between the intercooler 30 and the intake manifold 32. Moreover, an air flow meter 36 for detecting the quantity of intake air is installed near the downstream of the air cleaner 28 in the intake passage 26.

One end of an EGR passage 38 is connected to the vicinity of the intake manifold 32 of the intake passage 26. The other end of the EGR passage 38 is connected to the exhaust manifold 18 of the exhaust passage 20. In the present system, part of the exhaust gas (burnt gas) can be recirculated to the intake passage 26 via the EGR passage 38, that is, external EGR (Exhaust Gas Recirculation) can be performed.

An EGR cooler 40 for cooling the exhaust gas (EGR gas) passing through the EGR passage 38 is installed at some point in the EGR passage 38. An EGR valve 42 is installed downstream of the EGR cooler 40 in the EGR passage 38. Changing the opening degree of the EGR valve 42 can adjust the quantity of the exhaust gas passing through the EGR passage 38, that is, the quantity of external EGR gas.

Moreover, the system of the present embodiment further includes an accelerator press-down degree sensor 44 which detects a depression amount of an accelerator pedal (an accelerator press-down degree) of the vehicle equipped with the diesel engine 10, an intake pressure sensor 46 for detecting an intake manifold pressure (intake pressure), an exhaust pressure sensor 48 for detecting an exhaust manifold pressure (exhaust pressure), and an ECU (Electronic Control Unit) 50. Various sensors and actuators described above are connected to the ECU 50. The ECU 50 controls the operating state of the diesel engine 10 by actuating each actuator in accordance with predetermined programs based on the output of each sensor.

Figure 2:
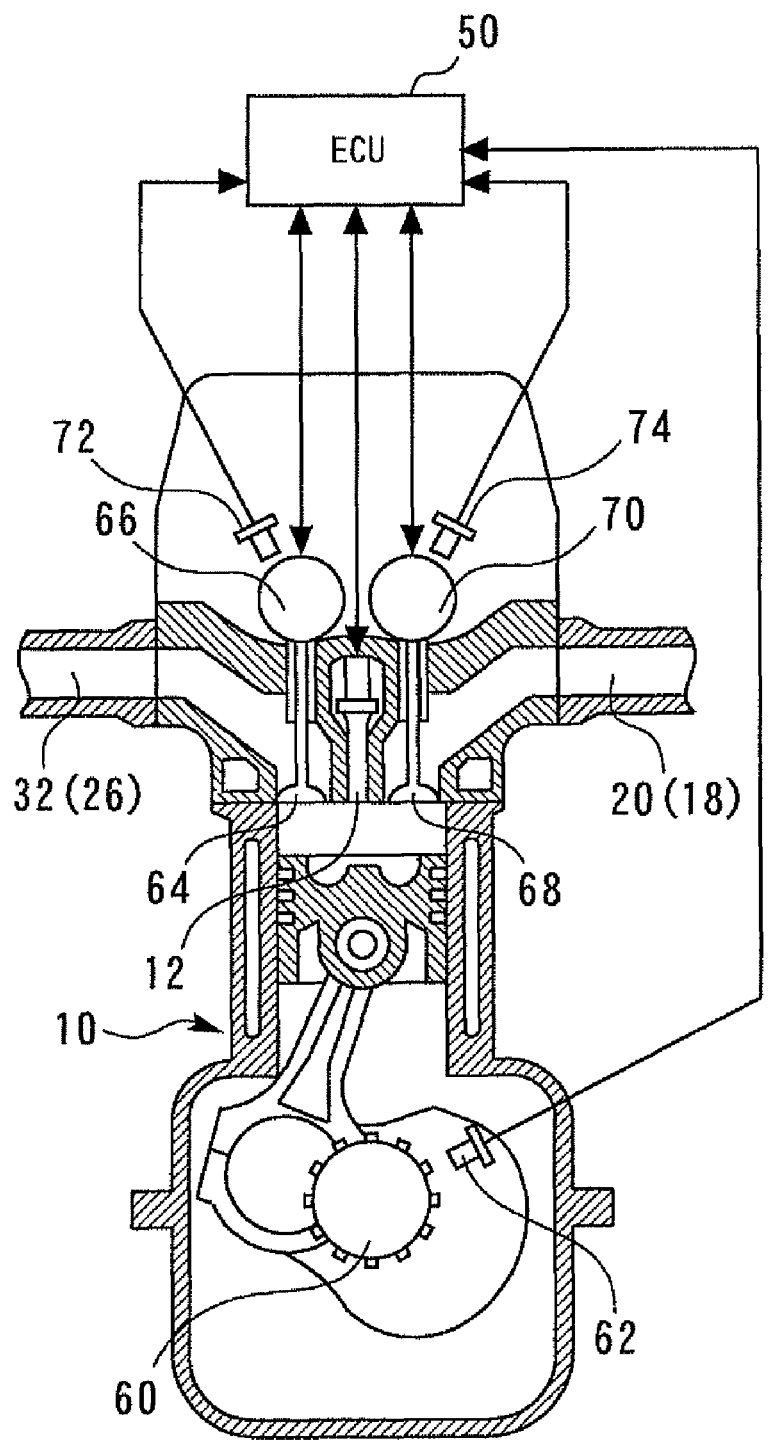
FIG. 2 is a diagram showing a cross section of a cylinder of the diesel engine in the system shown in FIG. 1.

FIG. 2 is a diagram showing a cross section of a cylinder of the diesel engine 10 in the system shown in FIG. 1. Hereinafter, the diesel engine 10 is further described. As shown in FIG. 2, a crank angle sensor 62 for detecting the rotational speed of a crankshaft 60 of the diesel engine 10, that is, a crank angle is installed in the vicinity of the crankshaft 60. The crank angle sensor 62 is connected to the ECU 50. The ECU 50 can calculate an engine speed on the basis of signals outputted from the crank angle sensor 62.

Moreover, the diesel engine 10 includes an intake variable valve mechanism 66 that is capable of changing valve opening characteristics of an intake valve 64, and an exhaust variable valve mechanism 70 that is capable of changing valve opening characteristics of an exhaust valve 68. Detailed configurations of the intake variable valve mechanism 66 and exhaust variable valve mechanism 70 are not specially limited to the above, and besides a mechanism that drives a cam with an electric motor, an electromagnetically-driven valve, a hydraulically-driven valve, or the like may be used, as well as a phase variable mechanism that is capable of continuously changing an opening and closing timing by varying the phase of a camshaft. Moreover, in the vicinity of an intake camshaft and exhaust camshaft, an intake cam angle sensor 72 and exhaust cam angle sensor 74 are respectively installed for detecting the rotational speed of each camshaft, that is, an intake cam angle and exhaust cam angle. These sensors 72, 74 are connected to the ECU 50. The ECU 50 can also calculate an advance angle amount of the opening and closing timing of the intake valve 64 and exhaust valve 68 on the basis of the signals outputted from the sensors 72, 74.

According to the intake variable valve mechanism 66 and exhaust variable valve mechanism 70, the length of a valve overlap period during which an opening period of the exhaust valve 68 overlaps with an opening period of the intake valve 64 (hereinafter, simply referred to as a "valve overlap period") can be changed.

[Volumetric Efficiency Improvement Control by Utilization of Exhaust Pressure Pulsation]

Figure 3:
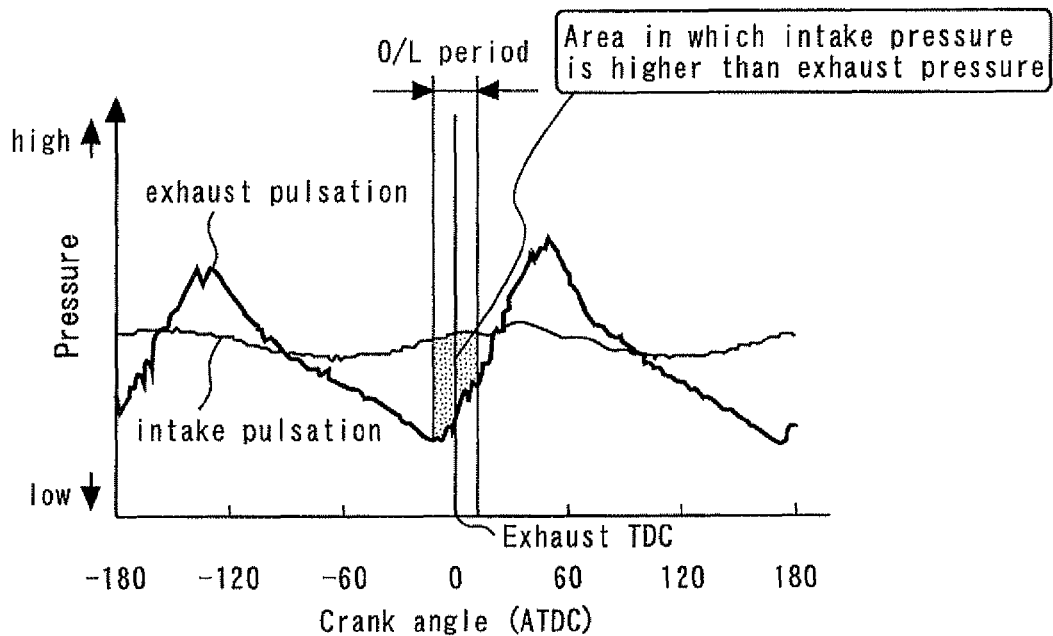
FIG. 3 is a diagram showing a relation of the intake manifold pressure and exhaust manifold pressure with respect to the crank angle while the volumetric efficiency improvement control is being performed.

The system of the present embodiment can arbitrarily adjust the valve overlap period since the intake variable valve mechanism and exhaust valve mechanism described above are provided. This allows the system of the present embodiment to perform the volumetric efficiency improvement control which improves a volumetric efficiency $\eta_v$ (in-cylinder air amount) of the diesel engine 10 by utilizing of pulsation of the exhaust manifold pressure in a predetermined operating region (for example, a low speed and high load region). FIG. 3 is a diagram showing a relation of the intake manifold pressure and exhaust manifold pressure with respect to the crank angle while the volumetric efficiency improvement control is being performed.

As shown in FIG. 3, the intake manifold pressure is nearly constant without regard to the crank angle. In contrast to this, the exhaust manifold pressure pulsates (periodically varies)

as the exhaust gas is intermittently discharged through the exhaust valve 68 of each cylinder. To be more specific, as the opening timing of the exhaust valve 68 retards, the timing at which the exhaust gas is released into the exhaust manifold 18 retards, and the waveform of the exhaust manifold pressure pulsation shifts to the right side in FIG. 3. In other words, the waveform of the exhaust manifold pressure pulsation moves from side to side in FIG. 3 in response to changing the opening timing of the exhaust valve 68. Moreover, the waveform of the exhaust manifold pressure pulsation also changes in response to a change in the flow speed of the exhaust gas flowing in the exhaust manifold associated with a change in the engine speed.

The waveform shown in FIG. 3 indicates a state in which the opening timing of the exhaust valve 68 is controlled taking into consideration the relation with engine speed in such a way that a trough of the exhaust manifold pressure pulsation coincides with the valve overlap period (O/L period) which is present near the exhaust top dead center (TDC). In addition, the waveform shown in FIG. 3 indicates a state in which the intake pressure (boost pressure) is increased with respect to the exhaust pressure as a result of supercharging being performed at a state at which turbo efficiency is high. In such a state, the area represented by applying a hatch pattern in FIG. 3, that is, an area in which the intake pressure is higher than the exhaust pressure in the valve overlap period, is sufficiently ensured. As a result, fresh air becomes easy to flow into the cylinder, while the effect of quickly expelling the burnt gas in the cylinder to the exhaust port by the inflow fresh gas (so called, a "scavenging effect") can be sufficiently achieved.

The scavenging effect as described above becomes higher as the area represented by applying a hatch pattern in FIG. 3 becomes larger. Therefore, if the adjustment of the valve overlap period, which is based on the adjustment of the opening timing of the intake valve 64 by use of the intake variable valve mechanism 66 and the adjustment of the closing timing of the exhaust valve 68 by use of the exhaust variable valve mechanism 70, is performed in order to ensure the area broadly, it becomes possible to achieve an enough scavenging effect. In this way, by performing the volumetric efficiency improvement control which utilizes the scavenging effect, it is made possible to reduce the quantity of residual gas and thereby increase, by an equivalent amount, the quantity of fresh air to be charged into the cylinder. That is, the volumetric efficiency $\eta_v$ can be increased. As a result, the torque of the diesel engine 10 can be well improved.

[Problem in a Case in which the Volumetric Efficiency Improvement Control is Applied to a System Equipped with a Variable Nozzle Type Turbocharger]

Figure 4:
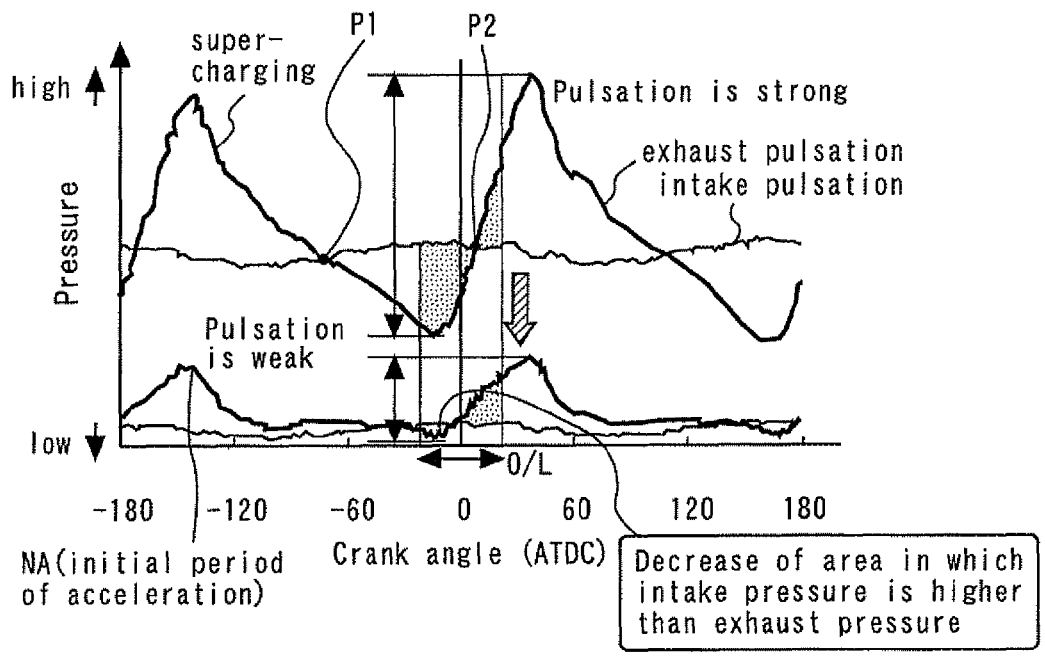
FIG. 4 is a diagram for explaining the effect of strength of the exhaust pressure pulsation on the volumetric efficiency improvement control.

FIG. 4 is a diagram for explaining the effect of strength of the exhaust pressure pulsation on the above-described volumetric efficiency improvement control.

FIG. 4 indicates a case in which the exhaust pressure pulsation with a sufficient strength is not generated since the quantity of intake air is small (in other words, engine load is low), such as in an early period of acceleration. In addition, FIG. 4 indicates a case in which the exhaust pressure pulsation with a sufficient strength is generated since the quantity of intake air amount has increased (in other words, engine has become high), and in which the intake pressure is favorably increased relative to the exhaust pressure due to the turbocharger 22 being used in a state where the turbo efficiency is high. To be more specific, as the load of the diesel engine 10 increases attended with a supercharging as a result of a request being made for shifting from an operating condition of a weak exhaust pressure pulsation such as an early period of acceleration as shown by the waveform on the lower side in FIG. 4 to a high load condition; the exhaust pressure pulsation is enhanced as well as the intake pressure (boost pressure) is favorably increased relative to the exhaust pressure as shown by the waveform shown on the upper side in FIG. 4.

As shown by the waveform on the lower side in FIG. 4, in a condition in which the exhaust pressure pulsation is weak (the amplitude of pulsation is small), the area in which the intake pressure is higher than the exhaust pressure is decreased in the vicinity of the exhaust top dead center in which the valve overlap period is provided. For this reason, in this case, the scavenging effect is decreased, and thus the effect offered by the above-described volumetric efficiency improvement control cannot become achieved satisfactorily.

The system of the present embodiment, as already described, includes the variable nozzle type turbocharger 22. In a conventional internal combustion engine equipped with such a turbocharger, a control is performed such that in order to rapidly increase the torque of the internal combustion engine at the time of acceleration, the opening degree of the variable nozzle is controlled to be nearly fully closed to increase boost pressure, thereby increasing the quantity of intake air. However, the system of the present embodiment includes the variable valve mechanisms 66 and 70 that are capable of adjusting the valve overlap period, as well as such variable nozzle type turbocharger 22.

In the system of the present embodiment having the configuration as described above, if the valve overlap period is provided in a state in which the opening degree of the variable nozzle 22c is controlled to be nearly fully closed at the time of acceleration, a sufficient scavenging effect as described above cannot be obtained since the exhaust pressure pulsation is weak at an early period of acceleration.

Moreover, at the time of acceleration, if the valve overlap period is provided in a state in which the opening degree of the variable nozzle 22c is controlled so as to be nearly fully closed, as a result of the opening degree of the variable nozzle 22c being controlled so as to be nearly fully closed, exhaust pressure is caused to increase during acceleration, thereby making it harder to achieve the scavenging effect; and as a result of the valve overlap period being provided, a blow-back of the exhaust gas to the intake port side occurs. As a result, compared with a case in which the opening degree of the variable nozzle 22c is controlled so as to be nearly fully closed and the valve overlap period is not provided at the time of acceleration, the volumetric efficiency $\eta_v$ is degraded. Hereafter, these problems will be further described in detail with reference to FIG. 5.

Figure 5:
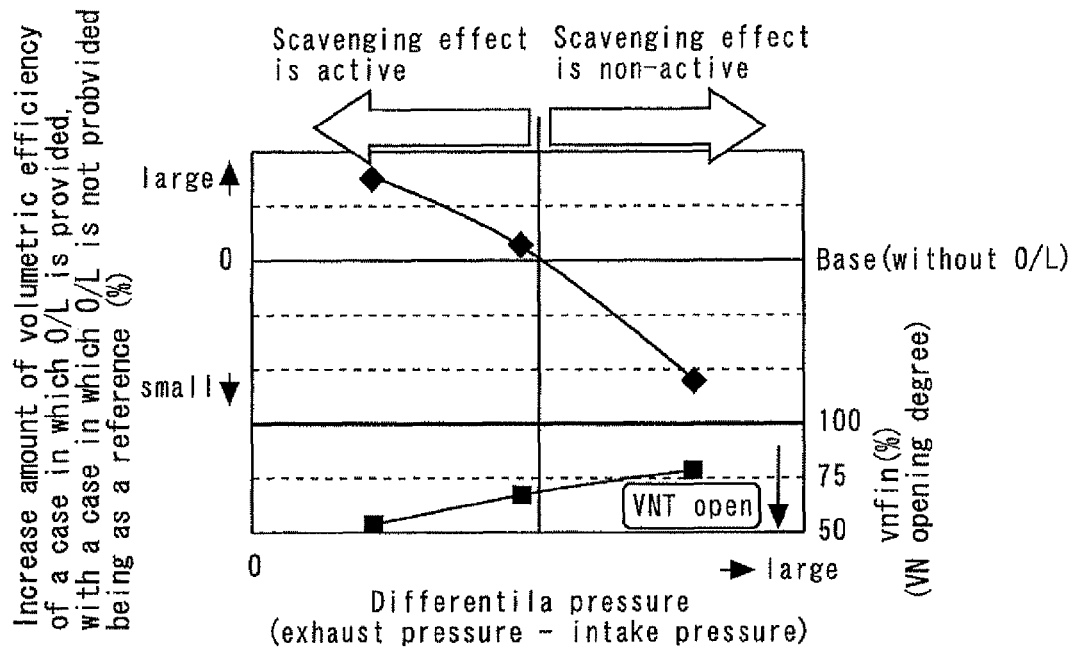
FIG. 5 is a diagram for explaining the effect of the opening degree of the variable nozzle on the scavenging effect described by using FIG. 3.

FIG. 5 is a diagram for explaining the effect of the opening degree of the variable nozzle 22e on the scavenging effect described by using above-described FIG. 3. Note that an increase amount of the volumetric efficiency $\eta_v$ in FIG. 5 means an increase amount of the volumetric efficiency $\eta_v$ of a case in which the valve overlap period is provided, with a case in which the valve overlap period is not provided being as a reference (zero).

Since the exhaust pressure rises as the opening degree of the variable nozzle 22c (VN opening degree) approaches a fully closed state, it is seen that, as shown in FIG. 5, the differential pressure (exhaust pressure–intake pressure) increases. Thus, as the VN opening degree is controlled toward the closing side, the exhaust pressure goes up too much, thereby degrading turbo efficiency. Since low turbo efficiency prevents the intake pressure from favorably going up relative to the exhaust pressure, achieving an enough scavenging effect becomes harder, and the area in which the intake pressure is higher than the exhaust pressure is decreased. As a result, if the VN opening degree is controlled toward the closing side, the scavenging effect described above is lost, thereby degrading the volumetric efficiency $\eta_v$ compared with a case in which the valve overlap period is not provided.

In contrast to this, if the VN opening degree is controlled toward the opening side, turbo efficiency is improved and thus the intake pressure is favorably increased relative to the exhaust pressure, thereby allowing the scavenging effect described above to be sufficiently achieved. Because of this, as seen from FIG. 5, as the VN opening degree is controlled toward the opening side, the volumetric efficiency n v is favorably improved compared with a case in which the valve overlap period is not provided. However, if the opening degree of the variable nozzle 22c is controlled so as to become a certain opening degree in the opening side in an initial period of acceleration in which the quantity of intake air is small, the time period required for the exhaust pressure pulsation to become strong is prolonged.

[Feature Portions of First Embodiment]

Figure 6:
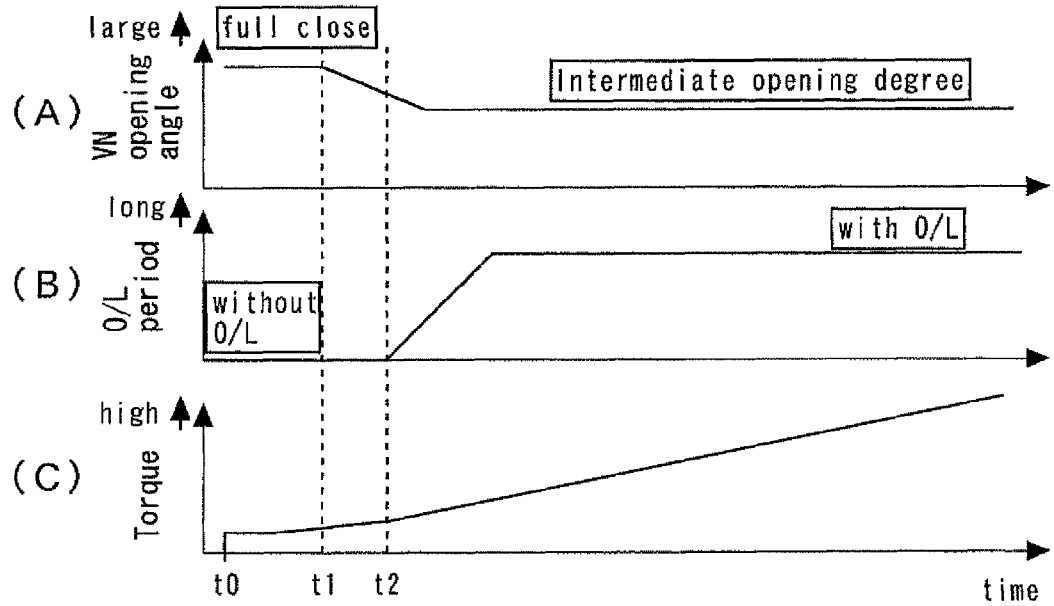
FIG. 6 is a time chart to illustrate a characteristic control in the first embodiment of the present invention.

FIG. 6 is a time chart to illustrate a characteristic control in the first embodiment of the present invention.

In the system of the present embodiment, a control described below is performed in the beginning of acceleration in which a request requiring a strong exhaust pressure pulsation is to be made, in order to solve the various problems described above, in the configuration including the variable nozzle type turbocharger 22 and the variable valve mechanisms 66 and 70 which make the valve overlap period adjustable.

That is, in the present embodiment, arrangement is made as follows: at a time point t0 at which an acceleration request from the driver is detected, the variable nozzle 22c is controlled such that the VN opening degree is fully closed as shown in FIG. 6(A), and the variable valve mechanisms 66 and 70 are controlled such that the valve overlap period is zero as shown in FIG. 6(B). Note that in the control example shown in FIG. 6, an example in which at the detection time point t0 of acceleration request, the VN opening degree and the valve overlap period have already been controlled as described above is used for the sake of convenience.

In the present embodiment, in a duration until a time point t1 is reached at which the exhaust pressure pulsation can be judged to have become strong, that is, in an initial period of acceleration, the control to make the VN opening degree fully closed and the valve overlap period zero as described above is continued. As a result, the torque of the diesel engine 10 starts going up gradually as shown in FIG. 6(C).

After that, when the above-described time point t1 at which the exhaust pressure pulsation can be judged to have become strong is reached, the VN opening degree starts to be opened toward a predetermined intermediate opening degree (to be more specific, an opening degree with a high turbo efficiency). On the other hand, the valve overlap period is still kept at zero at this time point t1. The adjustment of the valve overlap period is started when a time point t2 is reached, at which it is judged that a condition in which the intake pressure is higher than the exhaust pressure is achieved as a result of the turbo efficiency being improved as the time elapses thereafter. To be more specific, the valve overlap period starts to be expanded so as to overlap with a timing at which the trough of the exhaust pressure pulsation comes.

[Detailed Processes in First Embodiment]

Figure 7:
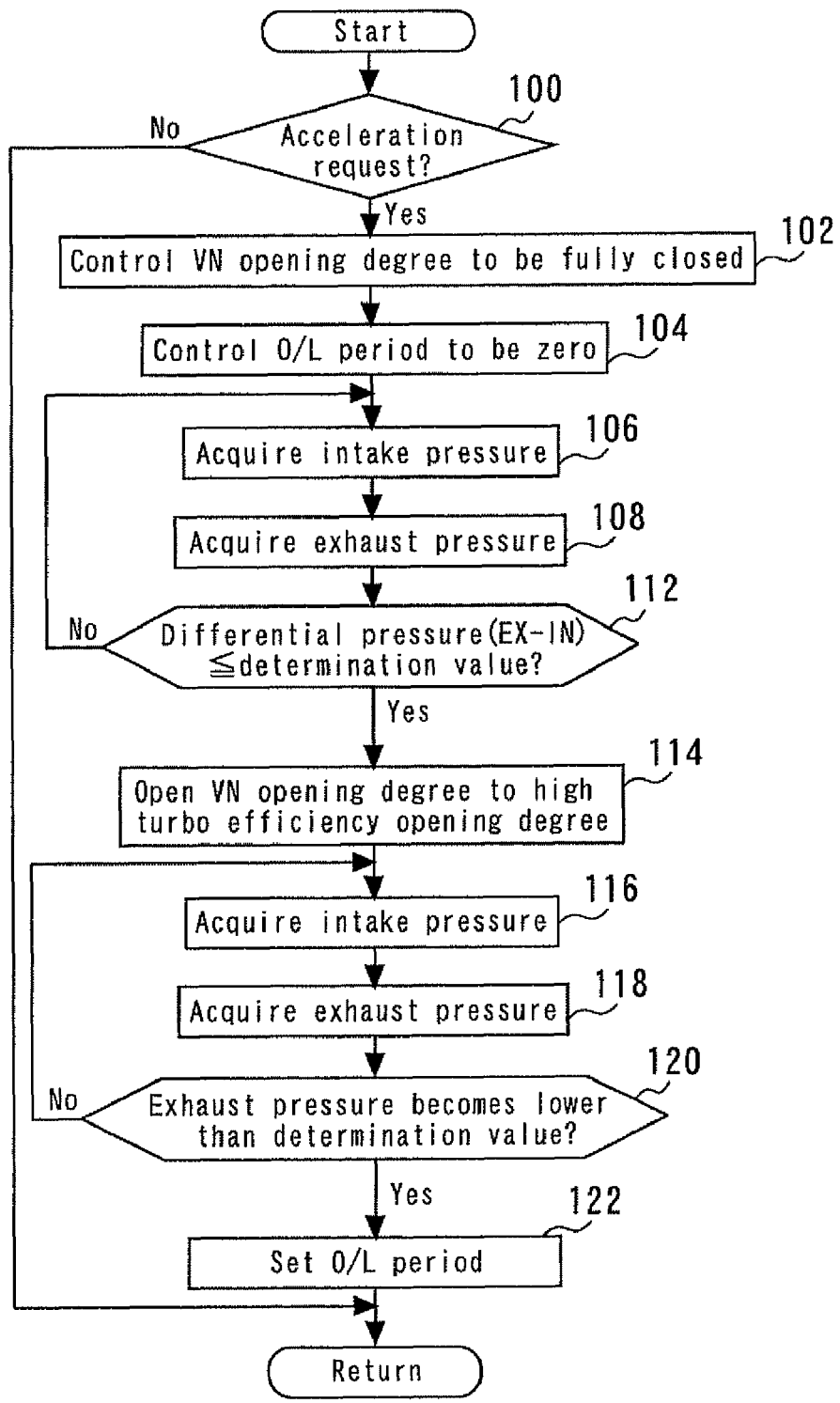
FIG. 7 is a flowchart illustrating a routine that is executed in the first embodiment of the present invention.

FIG. 7 is a flowchart of the routine which the ECU 50 executes in the present first embodiment to implement the above functionality.

In the routine shown in FIG. 7, first, it is determined whether or not an acceleration request of the vehicle from the driver is present based on the output of the accelerator pressdown degree sensor 44 (step 100). As a result, if it is determined that the acceleration request is present, then the opening degree of the variable nozzle 22c is controlled so as to become fully closed from an opening degree at the current time (step 102), and the valve overlap period is controlled so as to become zero from a period at the current time (step 104).

Next, an intake pressure (intake manifold pressure) is acquired on the basis of the output of the intake pressure sensor 46 (step 106), and an exhaust pressure (an exhaust manifold pressure) is acquired on the basis of the output of the exhaust pressure sensor 48 (step 108).

Next, it is determined whether or not the differential pressure between the exhaust pressure and the intake pressure has become a value equal to or less than a predetermined determination value (step 110). The determination value is a value preset as a value for judging whether or not the exhaust pressure pulsation has become sufficiently strong. As a result, the control to make the VN opening degree fully closed and the control to make the valve overlap period zero are continued, respectively, while the determination in present step 110 is negative.

On the other hand, if it can be determined that the exhaust pressure pulsation has become sufficiently strong due to the fact that the determination in above-described step 110 is positive, then the VN opening degree is opened so as to be an intermediate opening degree at which the turbo efficiency is high (step 112). The ECU 50 stores a map (not shown) that defines a VN opening degrees with high turbo efficiencies in the relation with the operating conditions of the diesel engine 10 such as the engine speed and the intake air quantity. In present step 112, with reference to such a map, the VN opening degree is to be opened so as to be a high turbo efficiency opening degree in an operating condition after the acceleration request.

Next, an intake pressure and an exhaust pressure at the current time are acquired (steps 114 and 116). Then, it is determined whether or not the exhaust pressure becomes lower than a predetermined determination value (step 118). As a result of the execution of the control in which the VN opening degree is opened to be a certain opening degree with a high turbo efficiency opening degree in above-described step 112, the exhaust pressure starts to decrease. The determination value in step 118 is a value preset as a value for judging whether or not the exhaust pressure is reduced to a condition in which the scavenging effect as described with reference to above-described FIG. 3 can be sufficiently obtained.

As a result, if it is determined that the determination in above-described step 118 is positive, that is, it can be judged that a pressure condition in which the sufficient scavenging effect can be obtained is fulfilled, a positive valve overlap period is set in such a way as to overlap with a timing at which the trough of the exhaust pressure pulsation comes (step 120). To be more specific, present step 120 is executed to acquire crank angles at two intersections (see intersections P1 and P2 shown in FIG. 4) between the exhaust pressure and intake pressure at the trough of the exhaust pressure pulsation occurred in the vicinity of the exhaust top dead center, by utilizing the respective pressure waveforms of the intake pressure and exhaust pressure detected in above-described steps 114 and 116. Then the valve overlap period is adjusted by using the variable valve mechanisms 66 and 70 such that the opening timing of the intake valve 64 becomes the above-described intersection P1 and the closing timing of the exhaust valve 68 becomes the above-described intersection P2.

To be more specific, the positions (crank angles) of these intersections P1 and P2 change in association with a change in the VN opening degree in above-described step 112. This is because a change in the VN opening degree results in a change in the relation of the intake pressure with respect to the exhaust pressure. According to the processing of present step 120, the valve overlap period is gradually changed in accordance with the changes of the positions of the intersections P1 and p2 caused by a change in the VN opening degree. To be specific, according to the processing of present step 1220 as the VN opening degree is opened, the area in which the intake pressure is higher than the exhaust pressure at the trough of the exhaust pressure pulsation generated near the exhaust top dead center expands gradually (in other words, the distance between the intersections P1 and P2 in FIG. 4 gradually moves away) and, accordingly, the valve overlap period gradually expands. Note that in present step 120, an arrangement is made such that based on the respective detection values of the actual exhaust pressure and intake pressure, the above described intersections P1 and P2, which are crank angles which should be the opening timing of the intake valve 64 and closing timing of the exhaust valve 68, are acquired. However, the method to acquire these intersections P1 and P2 is not limited to such method and the intersections P1 an P2 may be predetermined by experiment or the like in relation with, for example, the engine speed, VN opening degree, intake air quantity, engine load (torque ∞ fuel injection quantity), and opening timing of the exhaust valve 68. Then, the relation may be stored in the ECU 50 as a map so that the intersections P1 and P2 may be acquired with reference to such map in relation with the engine speed, VN opening degree, intake air quantity, engine load, and the opening timing of the exhaust valve 68 in an actual internal combustion engine.

According to the routine that has been described above with reference to FIG. 7, when an acceleration request which is an example of the request for enhancing the exhaust pressure pulsation is issued, first, in an early stage of acceleration, the VN opening degree is controlled so as to be fully closed and the valve overlap period is controlled so as to be zero. After that, at the time point when it can be determined that the exhaust pressure pulsation has become strong, the VN opening degree is opened so as to be an opening degree with a high turbo efficiency. Then, a valve overlap period in accordance with the VN opening degree is set after such opening operation of the VN opening degree is performed.

Figure 8:
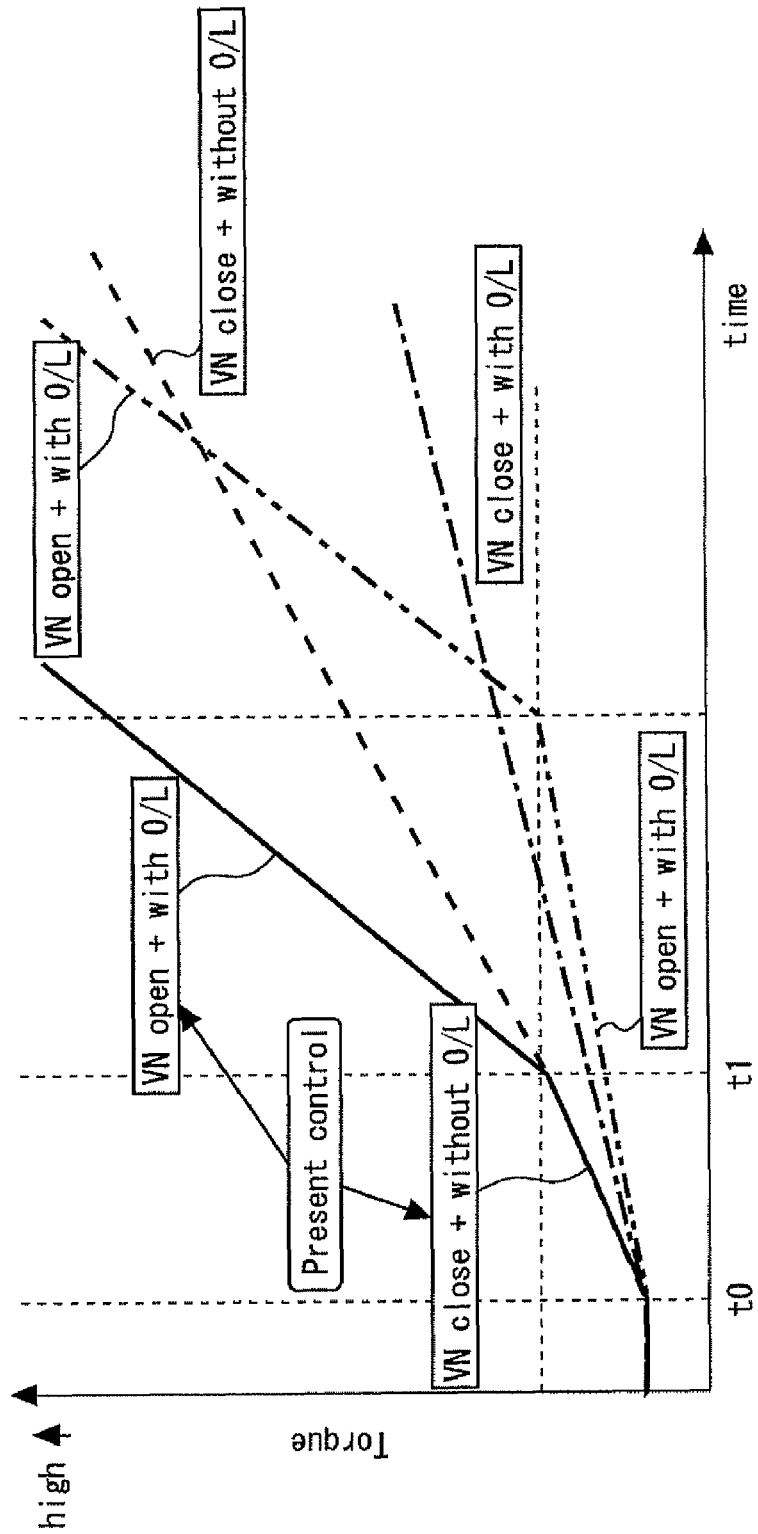
FIG. 8 is a conceptual diagram for explaining the effect to be obtained by executing the routine shown in FIG. 7.

FIG. 8 is a conceptual diagram for explaining the effect to be obtained by executing the routine shown in above-described FIG. 7. Note that in FIG. 8, the waveform shown by the solid line corresponds to the control of the present embodiment described above. In addition, the waveform shown by the broken line corresponds to the control in a case in which the VN opening degree remains zero at the acceleration in an internal combustion engine without an adjusting mechanism for the valve overlap period. Further, the waveform shown by one-dot chain line corresponds to the control in a case in which the VN opening degree has remained zero and the valve overlap period has been provided since the early stage of the acceleration. Furthermore, the waveform shown by two-dots chain line corresponds to the control in a case in which the VN opening degree is a certain value and the valve overlap period has been provided since the early stage of the acceleration.

The control of the present embodiment can provide the excellent effects described below compared to the other control patterns shown in FIG. 8.

First, the control of the present embodiment (solid line) is compared with the control represented by the broken line. As shown in FIG. 8, since the control represented by the broken line is identical with the control of the present embodiment in an initial stage of acceleration, there is no difference between them. However, while in the control of the present embodiment, the VN opening degree is opened at the time point t1 at which the exhaust pressure pulsation is judged to have become strong and thereafter the valve overlap period is set; in the control represented by the broken line, no valve overlap period remains to be provided even after the above-described time point t1. For this reason, the control represented by the broken line results in that the rise in the torque takes more time relative to the control of the present embodiment due to the lack of utilization of the scavenging effect through the exploitation of an enhanced exhaust pressure pulsation.

Next, the control of the present embodiment (solid line) is compared with the control represented by the one-dot chain line. In the control represented by the one-dot chain line, since, on the grounds that the exhaust pressure pulsation is weak, the valve overlap period is set in an initial stage of acceleration in which the intake pressure does not become higher relative to the exhaust pressure; the volumetric efficiency n v is degraded due to a blow-back of the exhaust gas to the intake side. Further, in the control represented by the one-dot chain line, since, as a result of the VN opening degree being kept fully closed even after an intermediate period of acceleration in which the exhaust pressure pulsation becomes strong, turbo efficiency is degraded and the intake pressure cannot be sufficiently raised relative to the exhaust pressure; the scavenging effect becomes harder to achieve and the volumetric efficiency n v is degraded due to a blow-back of the exhaust gas to the intake side. For this reason, the control represented by the one-dot chain line also results in that the rise in the torque takes more time and the magnitude of the torque itself cannot be sufficiently raised relative to the control of the present embodiment.

Next, the control of the present embodiment (solid line) is compared with the control represented by the two-dot chain line. In the control represented by the two-dot chain line, as a result of the VN opening degree being kept at a constant opening degree in an initial stage of acceleration, the time period required for the exhaust pressure pulsation to become strong is prolonged compared with the control of the present embodiment. For this reason, the control represented by the two-dot chain line results in that the rise in the torque takes more time relative to the control of the present embodiment due to such delay time in the generation of the exhaust pressure pulsation.

As so far described, according to the control of the present embodiment, an increase in the quantity of intake air can be promoted by controlling the VN opening degree to be fully closed, thereby enhancing the exhaust pressure pulsation at an early period, and thus it becomes possible to utilize the scavenging effect at an early period. Further, as a result of the valve overlap period being set to zero, it becomes possible to favorably prevent the degradation of the volumetric efficiency $\eta_v$ caused by a blow-back of the exhaust gas to the intake side.

Moreover, according to the control of the present embodiment, after an intermediate period of acceleration with an enhanced exhaust pressure pulsation, as a result of the VN 22c being opened to an opening degree with a high turbo efficiency, the exhaust pressure can be decreased relative to the intake pressure (boost pressure), thereby making it possible to sufficiently utilize the scavenging effect. Moreover, it is possible to combine the realization of such scavenging effect and the securement of turbo efficiency.

Further, according to the control of the present embodiment, because of the arrangement that the timing of setting the valve overlap period in an intermediate period of acceleration is certainly after the opening operation of the VN opening degree, it becomes possible to provide the valve overlap period after the area in which the intake pressure becomes higher relative to the exhaust pressure in the vicinity of the exhaust top dead center is securely ensured. As a result of this, it becomes possible to sufficiently utilize the scavenging effect while avoiding the occurrence of a blow-back of the exhaust gas to the intake side.

Furthermore, according to the control of the present embodiment, an arrangement is made such that in response to a change (the change amount or the change speed) of the VN opening degree in the intermediate period of acceleration, the valve overlap period which is set thereafter is adjusted. That is to say, in the present embodiment, since the valve overlap period is adjusted in accordance with the VN opening degree which is an influencing factor that defines the degree with which the intake pressure is higher with respect to the exhaust pressure at a timing when the trough of the exhaust pressure pulsation comes, it becomes possible to set the valve overlap period so as to certainly overlap with a timing when the trough of the exhaust pressure pulsation comes. This makes it possible to preferably prevent the degradation of the volumetric efficiency $\eta_v$ caused by a blow-back of the exhaust gas to the intake side. Further adding to this, according to the concrete method of the routine shown in FIG. 7, since an arrangement is made such that the valve overlap period is gradually changed in response to the change of the positions of these intersections P1 and P2 in association with a change in the VN opening degree, it becomes possible to set the valve overlap period so as to fully coincide with a timing at which the intake pressure is higher with respect to the exhaust pressure. Therefore, it becomes possible to obtain the scavenge effect while securely preventing the degradation of the volumetric efficiency n v caused by a blow-back of the exhaust gas to the intake side.

Meanwhile, in the first embodiment, which has been described above, an arrangement is made such that when the valve overlap period is set in association with the adjustment of the VN opening degree in an intermediate period of acceleration, the above described intersections P1 and P2 which should be the crank angles corresponding to the opening timing of the intake valve 64 and the closing timing of the exhaust valve 68 are acquired based on the respective detection values of an actual exhaust pressure and intake pressure so that the valve overlap period is gradually changed in accordance with the change of the intersections P1 and P2 caused by a change in the VN opening degree. However, the concrete method to set the valve overlap period to be performed in association with the adjustment of the VN opening degree in an intermediate period of acceleration is not limited to the foregoing. That is, a simple method may be used, in which, for example, when setting the valve overlap period, the advance angle quantity of opening timing of the intake valve 64 and the retard angle quantity of closing timing of the exhaust valve 68 are controlled at the same time and in the same quantity, and further the valve overlap period is gradually expanded as the VN 22c is opened.

Note that in the first embodiment, which has been described above, the "overlap period control means" according to the first aspect of the present invention, the "nozzle opening degree control means" according to the first aspect of the present invention, the "pulsation generation request detecting means" according to the first aspect of the present invention, the "nozzle closing control execution means" according to the first aspect of the present invention, and the "overlap period restricting means" according to the first aspect of the present invention are implemented by the ECU 50 controlling the valve overlap period by means of the intake variable valve mechanism 66 and the exhaust variable valve mechanism 70, controlling the opening degree of the variable nozzle 22c by assigning a command to a non-shown actuator, executing the processing of above-described step 100, executing the processing of above-described steps 102 and 110, and executing the processing of above-described steps 104 and 110, respectively. In addition, a fully closed opening degree of the variable nozzle 22c corresponds to the "first predetermined opening degree" according to the first aspect of the present invention.

Further, the high turbo efficiency opening degree corresponds to the "second predetermined opening degree" according to the third aspect of the present invention. In addition, the "nozzle opening control execution means" according to the third aspect of the present invention, and the "overlap period setting means" according to the third or the sixth aspect of the present invention are implemented by the ECU 50 executing the processing of above-described steps 110 and 112, and the processing of above-described steps 110 and 120, respectively.

Further, the "high efficiency opening degree setting means" according to the sixth aspect of the present invention is implemented by the ECU 50 executing steps 110 and 112.

Further, the intersection point P1 corresponds to the "first intersection" according to the eleventh aspect of the present invention; and the intersection point P2 corresponds to the "second intersection" according to the eleventh aspect of the present invention. In addition, the "pressure intersection information acquisition means" and "valve opening/closing timing adjusting means" according to the eleventh aspect of the present invention are implemented by the ECU 50 executing the processing of above-described step 120.

Second Embodiment

Next, a second embodiment of the present invention will be described with reference to FIGS. 9 to 13.

A system according to the present embodiment can be realized by letting an ECU 50 perform a routine shown in FIG. 13 to be described later as well as the sub routine shown in FIG. 7 using the hardware configuration shown in FIG. 1.

[Characteristic Portions of Second Embodiment]

Controls of the variable nozzle 22c and valve overlap period during acceleration according to the system of the present embodiment are the same as the control of the first embodiment described above except that there is a difference in the concrete setting method of the valve overlap period after the opening angle of the VN 22c is controlled to a value on an opening side during an intermediate period of acceleration.

Figure 9:
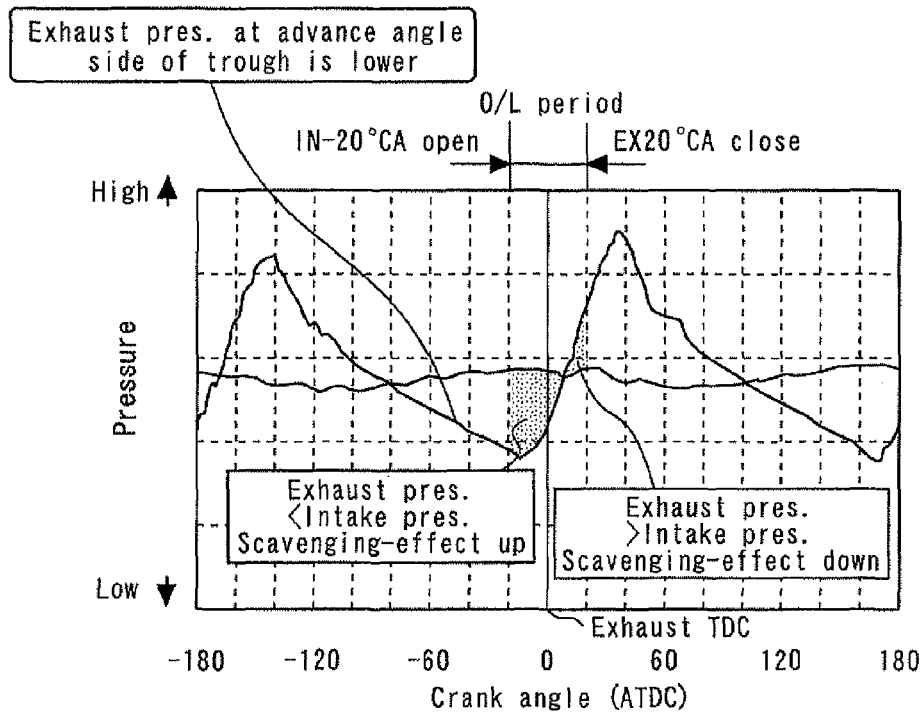
FIG. 9 is a diagram for explaining the setting method of the valve overlap period at an intermediate period of acceleration according to the second embodiment of the present invention.

FIG. 9 is a diagram for explaining the setting method of the valve overlap period at an intermediate period of acceleration according to the second embodiment of the present invention.

When the valve overlap period is set after allowing the VN 22c to be operated to an intermediate opening degree (a high turbo-efficiency opening degree) at a timing during the intermediate period of acceleration at which the exhaust pressure pulsation has become large, as explained in the modified embodiment of the above-described first embodiment, one simple and possible idea would be to control the advance amount of the opening timing of the intake valve 64 and the retard amount of the closing timing of the exhaust valve 68 at the same time and in the same quantity so that the valve overlap period is gradually enlarged as the VN 22c is opened. Such a method, however, may become inadequate to sufficiently obtain the scavenge effect by the utilization of the exhaust pressure pulsation if the waveform of the exhaust pressure pulsation is changed like the case shown in FIG. 9.

FIG. 9 shows that most of the trough of the exhaust pressure pulsation is located at an angle-advancing side relative to the exhaust top dead center. In such a case, the exhaust pressure at an angle-advancing side relative to the bottom of trough of the exhaust pressure pulsation is lower than that at an angle-retarding side relative thereto. In this case, as shown in FIG. 9, if both the advance amount of the opening timing of the intake valve 64 and the retard amount of the closing timing of the exhaust valve 68 from the exhaust top dead center are set by a same amount of 20° CA, the area in which the exhaust pressure is higher than the intake pressure becomes contained within the valve overlap period in the intake stroke. Containing such area reduces the scavenging effect due to a blowback of the exhaust gas to the intake side.

Accordingly, in the case shown in FIG. 9, in order to maximize the utilization of the scavenging effect, it is desirable that the closing timing of the exhaust valve 68 be ATDC 10° CA and that the opening timing of the intake valve 64 be BTDC 80° CA. That is to say, in this case, an increase in the advance amount of the opening timing of the intake valve 64 is preferred to that in the retard amount of the closing timing of the exhaust valve 68 in the valve overlap period. Moreover, the area in which the intake pressure is higher than the exhaust pressure is enlarged in response to the improvement of the turbo efficiency associated with opening the opening degree of the VN 22c. In the case shown in FIG. 9, the enlargement of such area progresses from the advance angle side of the exhaust top dead center. In this case, from the viewpoint of sufficient utilization of the scavenging effect, it is therefore preferred that an advance angle control of the opening angle of the intake valve 64 be started prior to an retard angle control of the closing timing of the exhaust valve 68.

As described above, the timing at which the trough of the exhaust pressure pulsation comes differs depending on conditions of the opening timing of the exhaust valve 68 and engine speed. In the present embodiment, accordingly, based on the phase where the trough of the exhaust pressure pulsation, which changes associated with the conditions of the opening timing of the exhaust valve 68 and engine speed, comes, an arrangement is made to change a ratio between the respective control amounts of the advance angle amount of the opening timing of the intake valve 64 and retard angle amount of the closing timing of the exhaust valve 68 when the valve overlap period is set after the VN 22c is operated. Further, an arrangement is made such that priorities of start timings of the advance angle control of the opening timing of the intake valve 64 and retard angle control of the closing timing of the exhaust valve 68 are determined in accordance with the phase at which the above-described trough comes.

Next, detailed examples of the controls according to the present embodiment described above will be described with reference to FIGS. 10 and 11.

Figure 10:
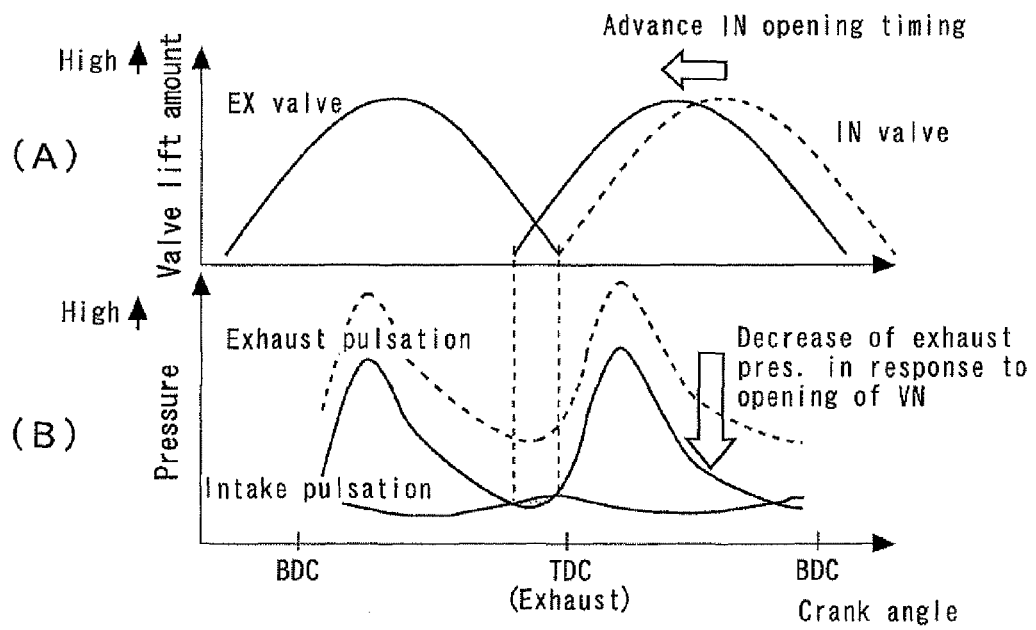
FIG. 10 is a diagram for explaining how the VN opening degree during opening is controlled in a case in which the advance angle control of the intake valve is preferentially controlled relative to the retard angle control of the closing timing of the exhaust valve.
Figure 11:
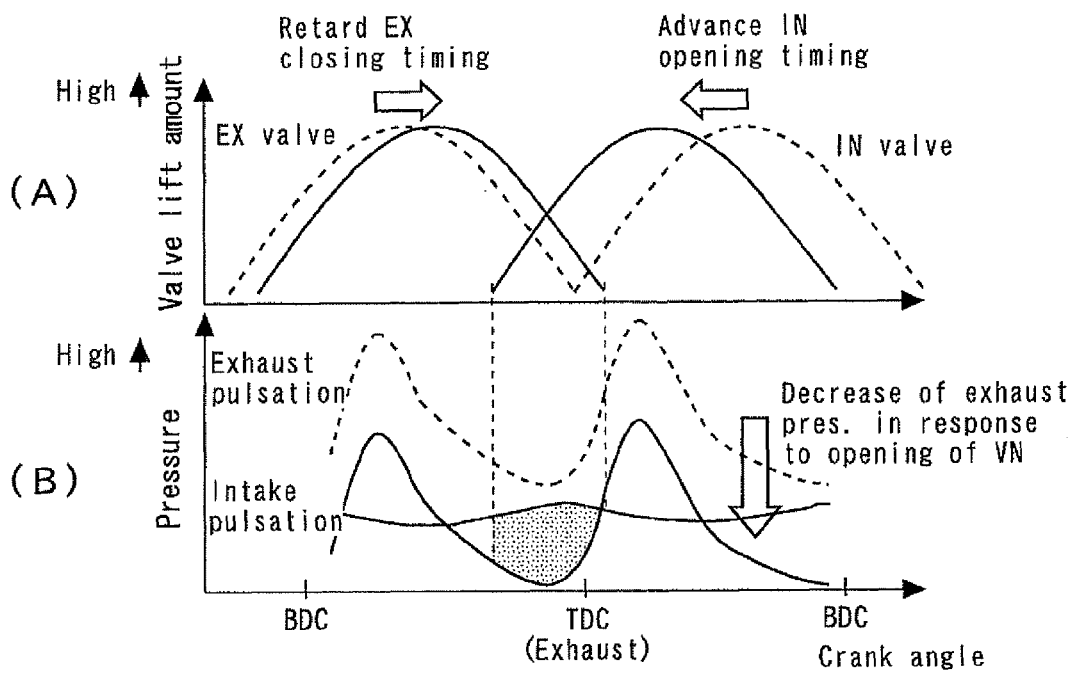
FIG. 11 is a diagram for explaining the control performed in the vicinity of a timing at which the opening control of the VN opening degree in the same case as that in FIG. 10 is completed.

FIG. 10 is a diagram for explaining how the VN opening degree during opening is controlled in a case in which the advance angle control of the intake valve 64 is preferentially controlled relative to the retard angle control of the closing timing of the exhaust valve 68, and FIG. 11 is a diagram for explaining the control performed in the vicinity of a timing at which the opening control of the VN opening degree in the same case as that in FIG. 10 is completed.

As shown in FIG. 10(B), while the VN opening degree is being opened, the exhaust pressure decreases as the turbo efficiency is gradually improved. That is, the waveform of the exhaust pressure transitions such that the waveform shown by the broken line approaches the waveform shown by the solid line. As a result, the area represented by applying a hatch pattern in FIG. 10(B), that is, an area in which the intake pressure is higher than the exhaust pressure in the timings in which the trough of the exhaust pressure pulsation comes, starts to appear.

Since the case shown in FIG. 10 is a case in which a peak of trough of the exhaust pressure pulsation lies to the advance angle side with respect to the exhaust top dead center, the above-described area represented by applying the hatch pattern starts to appear from the advance angle side with respect to the exhaust top dead center. According to the method of the present embodiment, in such case, when setting the valve overlap period, an arrangement is first made such that an advance angle control (an opening advancement control) of the opening timing of the intake valve 64 is performed as shown in FIG. 10(A).

After that, when a timing at which the turbo efficiency is optimized comes as the VN opening degree reaches to a target opening degree, the intake pressure becomes sufficiently enhanced with respect to the exhaust pressure as shown in FIG. 10(B). As a result, the area represented by applying the hatch pattern comes to also appear in the retard angle side with respect to the exhaust top dead center. When this timing has come, the method of the present embodiment performs a retard angle control of the closing timing of the exhaust valve 68 as well as the advance angle control of the opening timing of the intake valve 64 in response to such an enlargement of the area. In the case described with reference to such FIGS. 10 and 11, according to the method of the present embodiment, when setting the valve overlap period, an arrangement is further made such that in order to enlarge a ratio of the opening timing advance angle amount of the intake valve 64 with respect to the closing timing retard angle amount of the exhaust valve 68, the control amounts thereof are adjusted.

Figure 12:
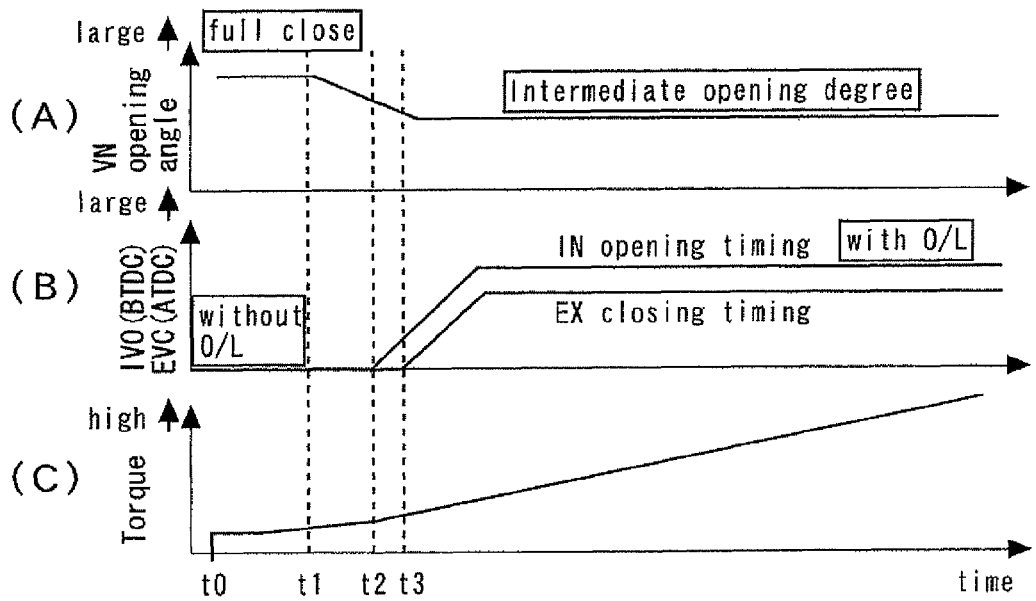
FIG. 12 is a time chart for explaining the execution timing of the characteristic control according to the second embodiment of the present invention.

FIG. 12 is a time chart for explaining the execution timing of the characteristic control described above according to the second embodiment of the present invention. Note that, in FIG. 12, the descriptions for the parts in which the same controls as those in the time chart shown in FIG. 6 in the first embodiment described above are performed will be simplified or omitted. Moreover, in the time chart shown in FIG. 12, description is also made on, by way of example, a case in which the advance angle control of the opening timing (IVO) of the intake valve 64 is preferentially controlled relative to the retard angle control of the closing timing (EVC) of the exhaust valve 68.

In the present embodiment, after the VN opening degree starts to be opened toward the intermediate opening degree with a high turbo efficiency at the time point t1, as shown in FIG. 12, when the time point t2 comes at which it can be judged that a condition in which the intake pressure is higher than the exhaust pressure is achieved as a result of the turbo efficiency being improved as the time elapses thereafter, the advance angle control of the opening timing of the intake valve 64 is started in first.

After that, it is judged that the area represented by applying a hatch pattern shown in FIG. 11 starts to sufficiently appear at the time point t3 at which the VN opening degree has reached a predetermined intermediate opening degree, while the retard angle control of the closing timing of the exhaust valve 68 is also to be started. Furthermore, in the control example shown in FIG. 12 as described above, when setting the valve overlap period, the arrangement is further made such that in order to enlarge a ratio of the opening timing advance angle amount of the intake valve 64 with respect to the closing timing retard angle amount of the exhaust valve

68, the control amounts thereof are adjusted. Note that the total value of both the control amounts itself is specified such that a desired valve overlap period is acquired in accordance with the current control opening degree of the VN 22c.

[Detailed Processes in Second Embodiment]

Figure 13:
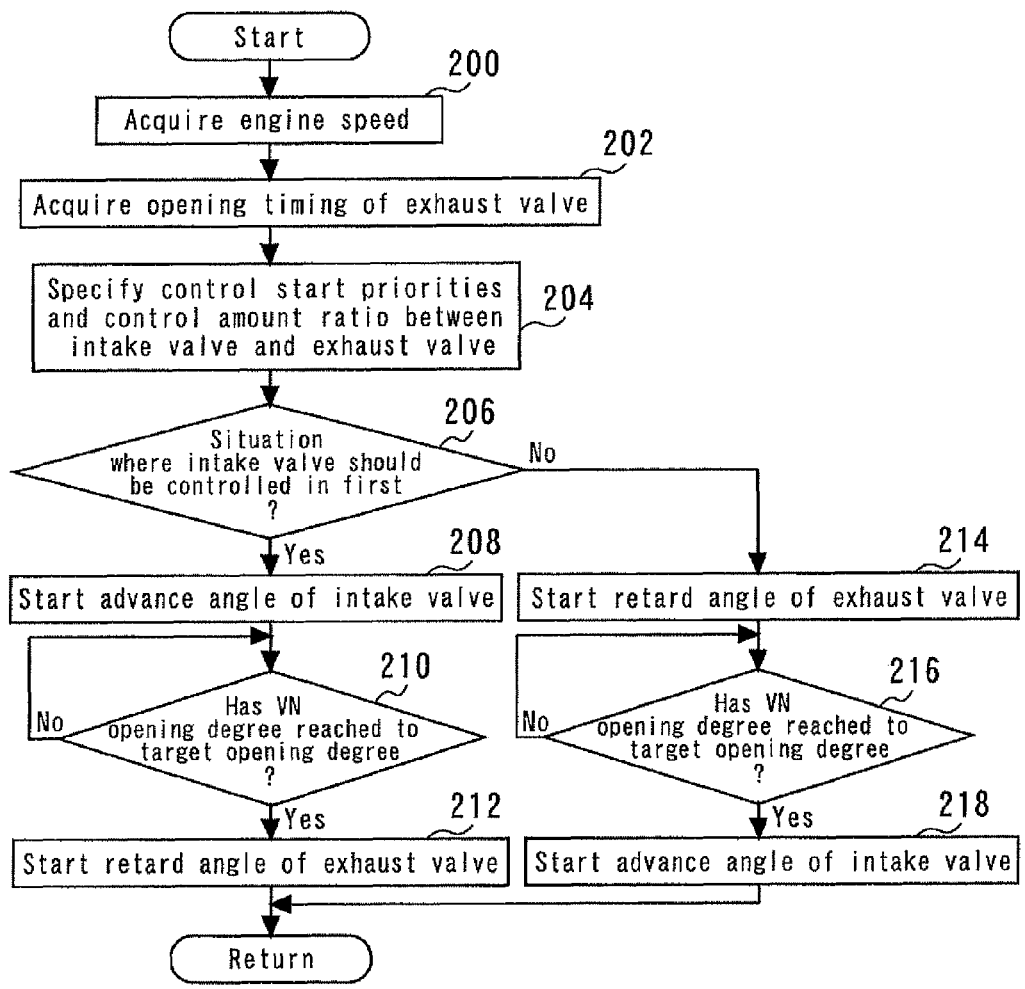
FIG. 13 is a flowchart illustrating a subroutine that is executed in the first embodiment of the present invention.

FIG. 13 is a flowchart of the subroutine which the ECU 50 executes in the present second embodiment to implement the above functionality. Note that processes of the subroutine are positioned as an alternative method of the process in step 120 of the main routine shown in FIG. 7 according to the first embodiment described above.

In the routine of FIG. 13, first, the engine speed is acquired based on the output of the crank angle sensor 62 (step 200). Then, the current opening timing of the exhaust valve 68 is acquired based on the output of the exhaust cam angle sensor 74 (step 202).

Based on the engine speed and the opening timing of the exhaust valve 68, next process is performed to determine control start priorities for the advance angle control of the opening timing of the intake valve 64 and retard angle control of the closing timing of the exhaust valve 68 when the valve overlap period is set, and the ratio between the control amounts of both the controls (step 204). As described above, the timing at which the trough of the exhaust pressure pulsation comes is specified in relation with the engine speed and the opening timing of the exhaust valve 68. The ECU 50 stores therein maps (not shown) that specify the control start priorities and the control amount ratio in relation with the engine speed and the opening timing of the exhaust valve 68. Present step 204 determines, with reference to these maps, that either of the advance angle control of the opening timing of the intake valve 64 and retard angle control of the closing timing of the exhaust valve 68 should be started in first, and either of the control amount ratios of them should be enhanced, respectively.

If it is determined in step 206 that the situation during the current startup of the routine is a situation in which the advance angle control of the opening timing of the intake valve 64 should be started in first (a situation in which the trough of the exhaust pressure pulsation lies to the advance angle side with respect to the exhaust top dead center), next, the advance angle control of the opening timing of the intake valve 64 is started in first (step 208).

Next, it is determined whether or not the VN opening degree has reached a target intermediate opening degree during the current acceleration (step 210). As a result, if the determination is positive, it is judged that the situation in which the area where the intake pressure is higher than the exhaust pressure extends to the retard angle side of the exhaust top dead center has comes, and then the retard angle control of the closing timing of the exhaust valve 68 is also started (step 212). Note that the VN opening degree can be acquired by detecting a control amount of an actuator (not shown) driving the variable nozzle 22c.

On the other hand, if it is determined in step 206 that the situation during the current startup of the routine is a situation in which the retard angle control of the closing timing of the exhaust valve 68 should be started in first (a situation in which the trough of the exhaust pressure pulsation lies to the retard angle side with respect to the exhaust top dead center), the retard angle control of the closing timing of the exhaust valve 68 is started in first (step 214).

Next, it is determined whether or not the VN opening degree has reached the target intermediate opening degree during the current acceleration (step 216). As a result, if the determination is positive, it is judged that the situation in which the area where the intake pressure is higher than the exhaust pressure extends to the advance angle side of the exhaust top dead center has comes, and then the advance angle control of the opening timing of the intake valve 64 is also started (step 218).

According to the routine shown in FIG. 13 as described so far, based on the phase of the exhaust pressure pulsation (more specifically, the phase of the trough of the exhaust pressure pulsation), it is determined that either of the advance angle control of the opening timing of the intake valve 64 and retard angle control of the closing timing of the exhaust valve 68 should be started in first when setting the valve overlap period associated with the adjustment of the VN opening degree. By such processes, when the area in which the intake pressure is higher than the exhaust pressure as a result of the VN opening degree being opened comes to appear, the valve overlap period becomes possible to promptly overlap with a portion where the above-described area comes to appear in first. This makes it possible to sufficiently obtain the scavenging effect.

Further, according to the above-described routine, based on the exhaust pressure pulsation (more specifically, the phase of the trough of the exhaust pressure pulsation), it is determined that the control amount ratio of either of the advance angle control of the opening timing of the intake valve 64 and retard angle control of the closing timing of the exhaust valve 68 should be enhanced when setting the valve overlap period associated with the adjustment of the VN opening degree. By such processes, the area in which the exhaust pressure is higher than the intake pressure (an area in which the above-described blow-back is concerned) can be excluded from the valve overlap period when enlarging the valve overlap period. This makes it possible to sufficiently obtain the scavenging effect.

Furthermore, the setting method of the valve overlap period after the opening operation of the VN 22c according to the first embodiment described above (see above-described step 120 of the routine shown in FIG. 7) is suitable for use in a system in which the intersections P1 and P2 between the exhaust pressure and intake pressure (see FIG. 4) can be acquired in an actual internal combustion engine. In contrast, the method in the present embodiment is suitable for use in a system in which such intersections P1 and P2 are difficult to be acquired in an actual internal combustion engine.

Note that in the second embodiment, which has been described above, the "control amount ratio setting means" according to the ninth aspect of the present invention is implemented by the ECU 50 executing the processing of above-described steps 200 to 204.

Further, the "control start order setting means" according to the tenth aspect of the present invention is implemented by the ECU 50 executing the processing of above-described steps 200 to 204.

Meanwhile, in the first and second embodiments, which have been described above, description is made on an acceleration request by way of example of requests to increase the exhaust pressure pulsation. The request to increase the exhaust pressure pulsation in the present invention is not limited to such acceleration request.

Moreover, in the first and second embodiments, which have been described above, the VN opening degree is controlled so as to be fully closed at an early stage of acceleration. However, in the present invention, the opening degree of the variable nozzle that is controlled for a duration from a detection time point, at which a request to enhance the exhaust pressure pulsation is detected, to a judgment time point, at which the exhaust pressure pulsation is judged to have been enhanced, is not always limited to the fully closed position, provided that the opening degree is an opening degree at a closing side with respect to that of the variable nozzle at the detection time point. In addition, although the valve overlap period is controlled so as to be zero at an early stage of acceleration, the valve overlap period set for the duration from the detection time point to the judgment time point in the present invention may not be fully zero but substantially zero and further may be a period shorter than the valve overlap period at the detection time point.

Third Embodiment

Next, a third embodiment of the present invention will be described with reference to FIGS. 14 to 18.

[System Configuration of Third Embodiment]

Figure 14:
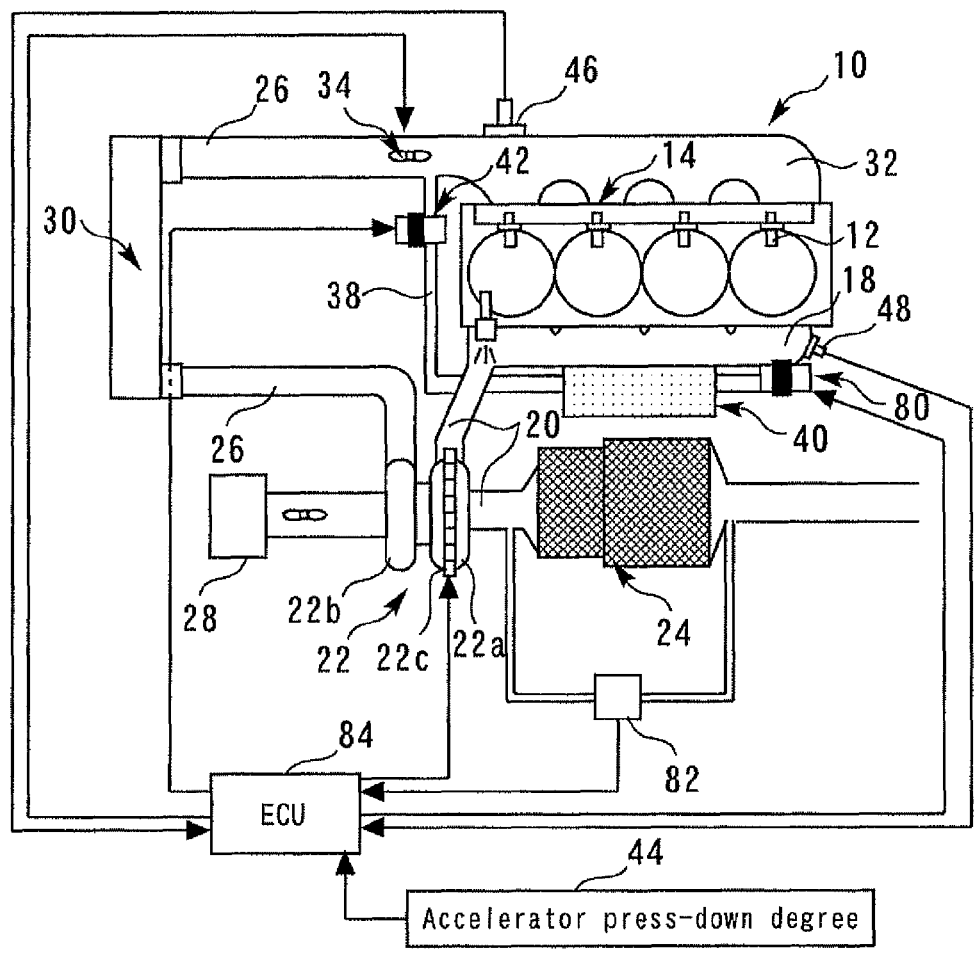
FIG. 14 is a diagram for explaining the system configuration according to a third embodiment of the present invention.

FIG. 14 is a diagram for explaining the system configuration according to a third embodiment of the present invention. As regards the elements in FIG. 14 that are the same as those in FIG. 1, their description is omitted or abridged with the same reference numerals assigned.

As shown in FIG. 14, the system of the present embodiment includes an exhaust volume changeover valve 80 in the connecting portion between the exhaust manifold 18 and the EGR passage 38. The exhaust volume changeover valve 80 is configured to be able to block the EGR passage 38 at the upstream side of the EGR cooler 40 (at the exhaust manifold 18 side).

Since the volumes of the EGR passage 38 and the EGR cooler 40 are not included in the exhaust system volume in a state in which the exhaust manifold 18 and the EGR passage 38 are blocked from each other by such exhaust volume changeover valve 80, the exhaust system volume can be reduced by the volumes of the EGR passage 38 and the EGR cooler 40 combined compared to at the normal operation (when the valve is open). Thus, according to the exhaust volume changeover valve 80, it is possible to make the exhaust system volume variable.

Figure 15:
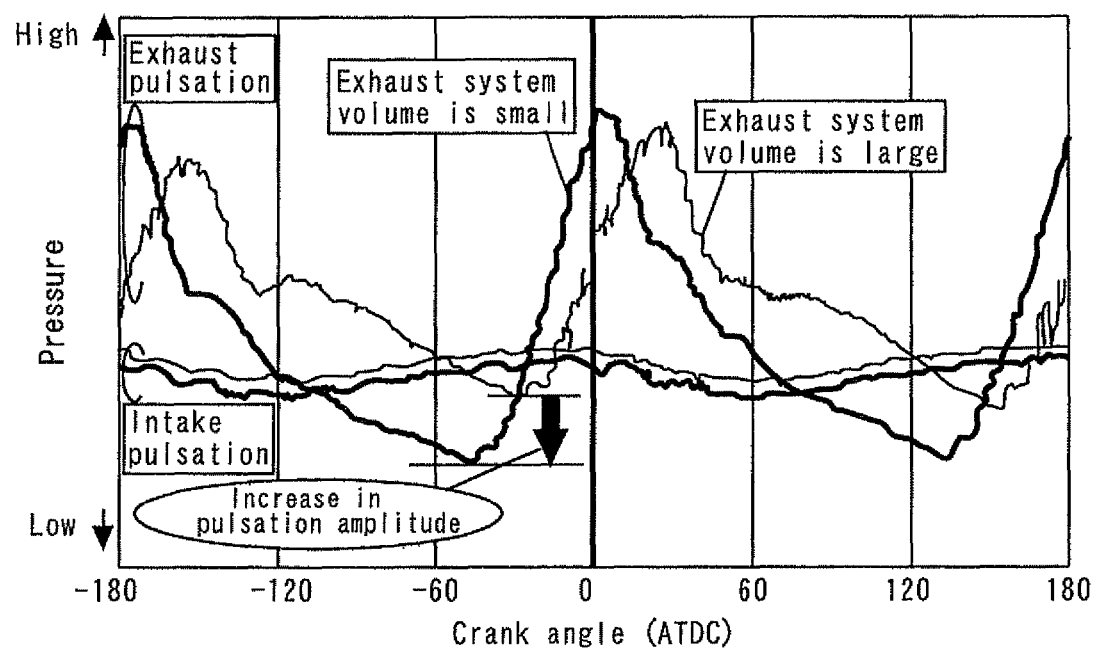
FIG. 15 is a diagram for explaining how the exhaust system volume affects the exhaust pressure pulsation.

FIG. 15 is a diagram for explaining how the exhaust system volume affects the exhaust pressure pulsation.

The waveform designated "exhaust system volume is large" in FIG. 15 corresponds to the case in which the exhaust volume changeover valve 80 is in an opened state, and the waveform designated "exhaust system volume is small" in FIG. 15 corresponds to the case in which the exhaust volume changeover valve 80 is in an closed state.

As shown in FIG. 15, in a case in which the exhaust system volume is reduced by the exhaust volume changeover valve 80, the amplitude of the exhaust pressure pulsation increases compared to a case in which the exhaust volume changeover valve 80 is enlarged. That is, the exhaust pressure pulsation becomes strong. Thus, in order to effectively make the exhaust pressure pulsation strong by using such exhaust volume changeover valve 80, it is preferable to place the valve in as close contact as possible with the exhaust manifold 18, such as an arrangement shown in FIG. 14, because the exhaust system volume can be more effectively reduced.

Moreover, as shown in FIG. 14, a differential pressure sensor 82 for detecting a differential pressure at the upstream and downstream of the DPF 24 is installed at the exhaust passage 20 near the DPF 24. The exhaust volume changeover valve 80 and the differential pressure sensor 82 as well as the sensors and actuators described previously in the first embodiment, are connected to the ECU 84 of the present embodiment. The ECU 84 can determine the degree of clogging of the DPF 24 by estimating a PM accumulating amount of the DPF 24 based on the output of the differential pressure sensor 82.

[Characteristic Portions of Third Embodiment]

Meanwhile, if the PM accumulating amount of the DPF 24 increases, the degree of flogging of the DPF 24 becomes high, and thus a back pressure (exhaust pressure) becomes high. Since, as a result, the area in which the intake pressure is higher than the exhaust pressure in the valve overlap period becomes small, a sufficient scavenging effect is hard to be acquired in a case in which a request to enhance the exhaust pressure pulsation, such as an acceleration request, is issued.

Moreover, as shown in above-referenced FIG. 15, if the exhaust system volume is large, the area in which the intake pressure is higher than the exhaust pressure in the valve overlap period becomes small. Because of this, a sufficient scavenging effect is hard to be acquired in a case in which a request to enhance the exhaust pressure pulsation, such as an acceleration request, is issued.

Accordingly, in the present embodiment, an arrangement is made such that the opening degree control of the variable nozzle 22c and control of the valve overlap period during acceleration is changed based on the degree of clogging of the DPF 24. A further arrangement is made such that in order to enhance the scavenging effect in a case in which the degree of clogging of the DPF 24 is relatively low, or in order to enhance the boost pressure in a case in which the degree of clogging of the DPF 24 is relatively high, the exhaust system volume is reduced by the exhaust volume changeover valve 80 in both of the above two cases.

More specifically, in order to enhance the torque by the utilization of the scavenging effect in the case in which the degree of clogging of the DPF 24 is relatively low, as in the control of the first embodiment described above, the valve overlap period is controlled so as to be short (for example, zero) for preventing the back-blow of the exhaust gas to the intake side at an early stage of acceleration, and then the VN opening degree is controlled so as to be fully closed after closing the exhaust volume changeover valve 80 for enhancing the exhaust pressure pulsation.

After that, at a time point at which it can be judged that the exhaust pressure pulsation has become strong, the VN opening degree is opened so as to be an intermediate opening degree with a high turbo efficiency. After such an opening operation of the VN 22c is performed, then, the valve overlap period according to the VN opening degree is set so as to overlap with timings in which the trough of the exhaust pressure pulsation comes.

On the other hand, an effective scavenging effect is not acquired in the case in which the degree of clogging of the DPF 24 is relatively large. Because of this, in order to enhance the torque by the utilization of an increase in the boost pressure, the valve overlap period is controlled so as to be short for preventing the back-blow of the exhaust gas to the intake side at an early stage of acceleration, and then the VN opening degree is controlled so as to be fully closed after closing the exhaust volume changeover valve 80 for enhancing the boost pressure. Furthermore, in this case, the above-described control of the VN opening degree and valve overlap period at an early stage of acceleration is continued during acceleration thereafter.

Figure 16:
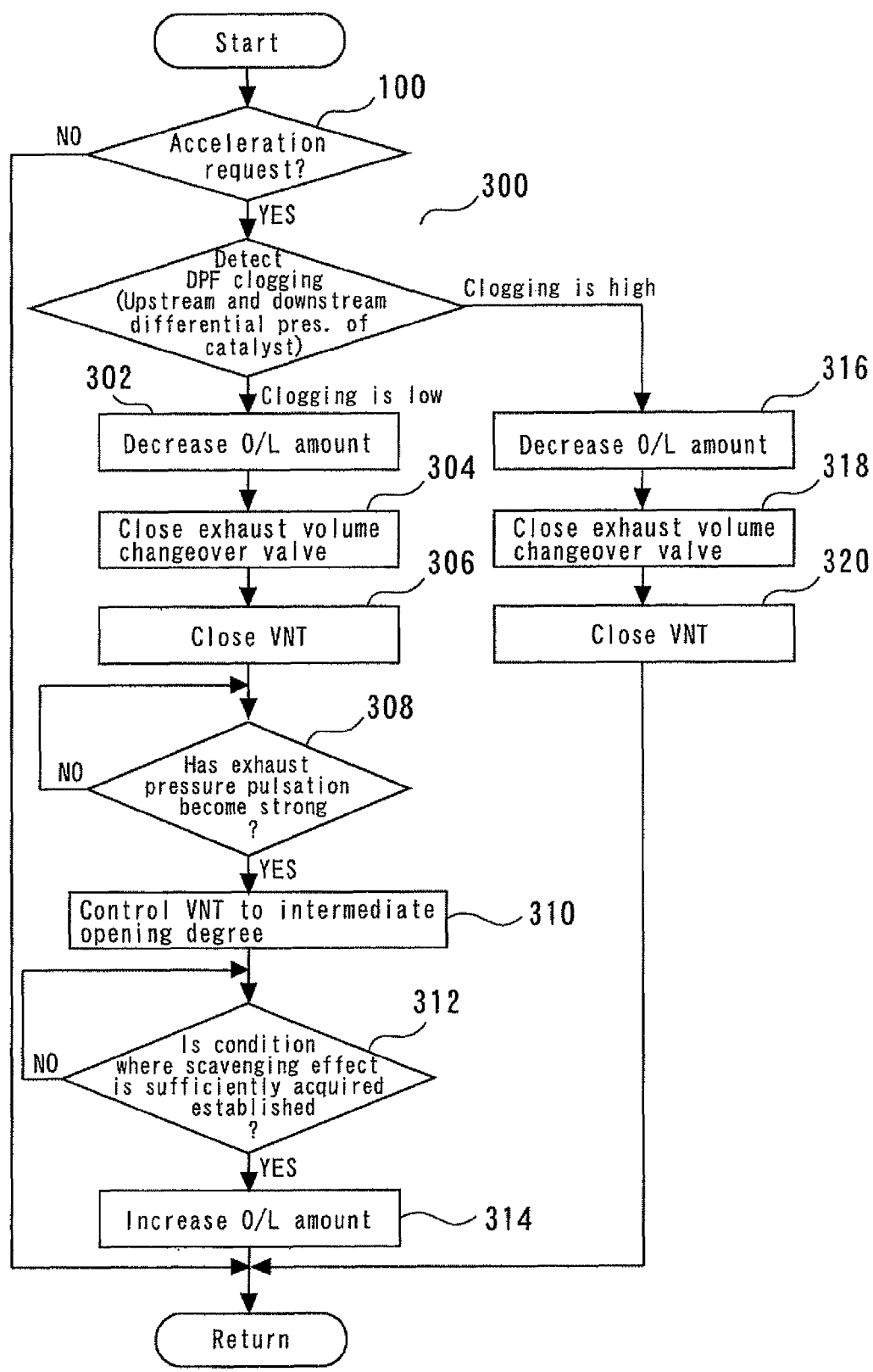
FIG. 16 is a flowchart illustrating a routine that is executed in the first embodiment of the present invention.

FIG. 16 is a flowchart of the routine which the ECU 84 executes in the present third embodiment to implement the above functionality.

In the routine shown in FIG. 16, first, it is determined that the acceleration request of the vehicle from the driver is issued in step 100, the degree of clogging of the DPF 24 is next detected (determined) based on the differential pressure detected by the differential pressure sensor 82 at the upstream and downstream of the DPF 24 (step 300).

As a result, it is determined that the degree of clogging of the DPF 24 is relatively low, the valve overlap period (OIL amount) is first controlled so as to become shorter than a value at the current time (for example, to be zero) (step 302). After that, the exhaust volume changeover valve 80 is controlled so as to be the closed state (step 304).

After that, further, the opening degree of the variable nozzle (VN) 22c is controlled so as to be closed relative to a value at the current time (for example, to be the fully closed opening degree) (step 306). Next, it is determined whether or not the exhaust pressure pulsation has been sufficiently enhanced (step 308). Specifically, the strength of the exhaust pressure pulsation can be judged based on, for example, measured values by the exhaust pressure sensor 48, or estimation results of combustion state using a combustion model which is constructed within the ECU 84.

If it can be judged that the exhaust pressure pulsation has been sufficiently enhanced in above-described step 308, next, the VN opening degree is opened so as to be the intermediate opening degree with a high turbo efficiency (step 310).

Next, it is judged whether or not a condition on which a sufficient scavenging effect is acquired has been established (step 312). To be specific, this judgment can be performed by discriminating, for example, whether or not a differential pressure between the exhaust pressure and intake pressure is equal to or less than a predetermined judgment value.

If it is judged that the condition on which a sufficient scavenging effect is acquired has been established, a positive valve overlap period is set in such a way as to overlap with timings in which the trough of the exhaust pressure pulsation comes (step 314).

If, on the other hand, it is determined that the degree of clogging of the DPF 24 is relatively high, first, the valve overlap period (O/L amount) is controlled so as to be shorter than a value at the current time (for example, to be zero) (step 316). After that, the exhaust volume changeover valve 80 is controlled so as to be the closed state (step 318).

After that, further, the opening degree of the variable nozzle (VN) 22c is controlled so as to be closed relative to a value at the current time (for example, to be the fully closed opening degree) (step 320).

FIGS. 17 and 18 are time charts showing examples of the operation at the time of acceleration implemented by the processes of the routine shown in above-referenced FIG. 16. To be more specific, FIGS. 17(A) to 17(D), and FIGS. 18(A) to 18(D) show, from a top diagram in order, each time variation in opening degree setting of the exhaust volume changeover valve 80, in VN opening degree, in valve overlap period (O/L amount), and in torque. Moreover, FIG. 17 corresponds to the operation in the case in which the degree of clogging of the DPF 24 is relatively low, and FIG. 18 corresponds to the operation in the case in which the degree of clogging of the DPF 24 is relatively high.

In the case in which the degree of clogging of the DPF 24 is relatively low, as shown in FIG. 17(C), first, the valve overlap period is controlled so as to be zero when an acceleration request is detected. Since the differential pressure between the exhaust pressure and intake pressure is large at an early stage of acceleration, the scavenging effect cannot be effectively utilized even if the valve overlap period is set longwise and, further, the volumetric efficiency $\eta_v$ is degraded due to the back-blow of the exhaust gas to the intake side. In contrast, according to the control of the valve overlap period shown in FIG. 17(C), it becomes possible to successfully prevent such degradation of the volumetric efficiency $\eta_v$.

Moreover, as shown in FIG. 17(A), the exhaust volume changeover valve 80 is closed after it is confirmed that the valve overlap period is controlled to be zero and, as shown in FIG. 17(B), the VN opening degree is controlled to the fully closed opening degree after the closing of the exhaust volume changeover valve 80. In this way, the exhaust system volume becomes small if the exhaust volume changeover valve 80 is closed, thereby making the exhaust pressure pulsation strong. Moreover, controlling the VN opening degree so as to be fully closed can make the exhaust pressure pulsation strong. As a result of them, it becomes possible to utilize the scavenging effect more effectively in later stages.

Further, in the case in which the degree of clogging of the DPF 24 is relatively low, as shown in FIG. 17(B), the VN opening degree is controlled so as to be an intermediate opening degree with a high turbo efficiency at a time point at which it is judged that the exhaust pressure pulsation has become sufficiently strong. This makes it possible to sufficiently decrease the differential pressure between the exhaust pressure and intake pressure, thereby enhancing the scavenging effect more.

Furthermore, after the VN opening degree is controlled to the above-described intermediate opening degree, that is, the VN opening degree is adjusted to the optimum opening degree for acquiring the scavenging effect, as shown in FIG. 17(C), the positive valve overlap period is set in such a way as to overlap with a timing at which the trough of the exhaust pressure pulsation comes. This makes it possible to effectively increase the torque of the diesel engine 10 by effectively utilizing the scavenging effect as shown in FIG. 17(D). By controlling the valve overlap period, the VN opening degree and the exhaust system volume in the order described so far, it becomes possible to successfully shorten a time needed for the rise in the torque of the diesel engine 10 during acceleration.

On the other hand, also in the case in which the degree of clogging of the DPF 24 is relatively high, as shown in FIG. 18(C), first, the valve overlap period is controlled so as to be zero if an acceleration request is detected. This makes it possible to sufficiently prevent the volumetric efficiency $\eta_v$ from degrading.

Moreover, as shown in FIG. 18(A), the exhaust volume changeover valve 80 is closed after it is confirmed that the valve overlap period is controlled to be zero and, as shown in FIG. 18(B), the VN opening degree is controlled to be the fully closed opening degree after closing the exhaust volume changeover valve 80. In this way, since the exhaust system volume becomes small if the exhaust volume changeover valve 80 is closed, the exhaust pressure (back pressure) becomes high. As a result, the turbo rotational speed increases, thereby enhancing the boost pressure. In addition, controlling the VN opening degree to be fully closed can enhance the boost pressure while the turbo efficiency degrades, thereby increasing the intake air quantity.

Here, in the case in which the degree of clogging of the DPF 24 is relatively high, in contrast to the case in which the degree of clogging of the DPF 24 is relatively low, during acceleration, the VN opening degree is kept to be the fully closed opening degree and the valve overlap period is kept to be zero. According to such controls, by aiming at the suppression of the back-flow and the rise in the boost pressure, as shown in FIG. 18(D), the torque of the diesel engine 10 can be increased effectively in a situation in which an effective scavenging effect cannot be expected because the degree of clogging of the DPF 24 is high.

As described so far, according to the routine shown in above-referenced FIG. 16, the controls of the VN opening degree and valve overlap period during acceleration (after the timing at which it is judged that the exhaust pressure pulsation has been enhanced) are changed based on the degree of clogging of the DPF 24.

To be more specific, in the case in which the degree of clogging of the DPF 24 is relatively low, by the control of the VN opening degree and control of the valve overlap period, the rise in the torque by use of the scavenging effect is performed after it is judged that the exhaust pressure pulsation has been enhanced. Since, on the other hand, the scavenging effect cannot be acquired in the case in which the degree of clogging of the DPF 24 is relatively high, the rise in the torque by use of the rise in the boost pressure is performed by the VN opening degree being kept to be the fully closed opening degree and by the valve overlap period being kept to be zero. This makes it possible to specify the controls of the VN opening degree and valve overlap period based on the clogging state of the DPF 24 so that the exhaust pressure pulsation can be utilized effectively.

Meanwhile, in the third embodiment, which has been described above, description is made on, by an example of an exhaust purifying apparatus disposed at the exhaust passage in the present invention, the DPF 24 for trapping PM. The exhaust purifying apparatus targeted for the present invention, however, is not limited to the DPF24 and may be other exhaust purifying catalysts.

Note that in the third embodiment, which has been described above, the "clogging determining means" according to the twelfth aspect of the present invention, and the "control changing means" according to the twelfth aspect of the present invention are implemented by the ECU 84 executing the processing of above-described step 300, and a series of processing of the routine shown in FIG. 16, respectively.

Further, the "low-clogging-case nozzle opening control execution means" according to the thirteenth aspect of the present invention, and the "low-clogging-case overlap period setting means" according to the thirteenth aspect of the present invention are implemented by the ECU 84 executing the processing of above-described step 310, and the processing of above-described step 314, respectively.

Further, the "exhaust system volume variable means" according to the fourteenth or sixteenth aspect of the present invention is implemented by the ECU 84 executing the processing of above-described step 304 or 318.

Further, the "high-clogging-case control means" according to the fifteenth aspect of the present invention is implemented by the ECU 84 executing the processing of above-described steps 316 and 320.

The invention claimed is:

1. A control apparatus for an internal combustion engine, the apparatus comprising:
    a variable valve mechanism which makes variable a valve overlap period, in which an intake valve opening period overlaps with an exhaust valve opening period;
    overlap period control means for controlling the variable valve mechanism to control the valve overlap period;
    a turbocharger which includes a turbine driven by exhaust energy of the internal combustion engine, and a variable nozzle for adjusting a flow rate of exhaust gas supplied to the turbine;
    nozzle opening degree control means for controlling an opening degree of the variable nozzle; and
    acceleration request detecting means for detecting existence of nonexistence of an acceleration request,
    wherein the nozzle opening degree control means includes nozzle closing control execution means for controlling the opening degree of the variable nozzle so as to be a first predetermined opening degree, which is on a closing side with respect to the opening degree of the variable nozzle at a detection time point at which the acceleration request is detected, for a duration from the detection time point to a judgment time point at which the exhaust pressure pulsation is judged to have been enhanced during acceleration,
    wherein the overlap period control means includes overlap period restricting means for controlling the valve overlap period in such a way as to be shorten than the valve overlap period at the detection time point, for the duration from the detection time point to the judgment time point,
    wherein the nozzle opening degree control means further includes nozzle opening control execution means for controlling the opening degree of the variable nozzle to be a second predetermined opening degree which is on an opening side with respect to the first predetermined opening degree, after the determination time point is passed, and
    wherein the overlap period control means further includes overlap period setting means for setting the valve overlap period in such a way as to overlap with a timing at which trough of the exhaust pressure pulsation comes after the judgment time point is passed.

2. The control apparatus for the internal combustion engine according to claim 1,
    wherein the overlap period restricting means restricts the valve overlap period to be zero or substantially zero for the duration from the detection time point to the judgment time point.

3. The control apparatus for the internal combustion engine according to claim 1,
    wherein the overlap period setting means sets the valve overlap period in such a way as to overlap with the timing at which the trough of the exhaust pressure pulsation comes, after the nozzle opening control execution means controls the opening degree of the variable nozzle to be the second predetermined opening degree.

4. The control apparatus for the internal combustion engine according to claim 1,
    wherein the overlap period setting means adjusts the valve overlap period which is set after the judgment time point is passed, in accordance with a change in the opening degree of the variable nozzle caused by the nozzle opening control execution means.

5. The control apparatus for the internal combustion engine according to claim 1,
    wherein the nozzle opening degree control means further includes high efficiency opening degree setting means for, after the judgment time point is passed, controlling the opening degree of the variable nozzle to be a high efficiency opening degree at which turbocharger efficiency of the turbocharger is higher than that at the detection time point, and
    wherein the overlap period control means further includes overlap period setting means for setting the valve overlap period in such a way as to overlap with a timing at which trough of the exhaust pressure pulsation comes, after the judgment time point is passed.

6. The control apparatus for the internal combustion engine according to claim 5,
    wherein the overlap period setting means sets the valve overlap period in such a way as to overlap with the timing at which the trough of the exhaust pressure pulsation comes, after the high efficiency opening degree setting means controls the opening degree of the variable nozzle to be the high efficiency opening degree.

7. The control apparatus for the internal combustion engine according to claim 5,
wherein the overlap period setting means adjusts the valve overlap period which is set after the judgment time point is passed, in accordance with a change in the opening degree of the variable nozzle caused by the high efficiency opening degree setting means.

8. The control apparatus for the internal combustion engine according to claim 1,
wherein the variable valve mechanism includes an intake variable valve mechanism which makes variable an opening timing of an intake valve, and an exhaust variable valve mechanism which makes variable a closing timing of an exhaust valve, and
wherein the overlap period setting means further includes control amount ratio setting means for, when the valve overlap period is set in such a way as to overlap with the timing at which the trough of the exhaust pressure pulsation comes after the judgment time point is passed, setting a ratio between respective control amounts of an advance-angle amount of the opening timing of the intake valve and a retard-angle amount of the closing timing of the exhaust valve, based on a phase at which the trough of the exhaust pressure pulsation comes.

9. The control apparatus for the internal combustion engine according to claim 1,
wherein the variable valve mechanism includes an intake variable valve mechanism which makes variable an opening timing of an intake valve, and an exhaust variable valve mechanism which makes variable a closing timing of an exhaust valve, and
wherein the overlap period setting means further includes control start order setting means for, when the valve overlap period is set in such a way as to overlap with the timing at which the trough of the exhaust pressure pulsation comes after the judgment time point is passed, setting a start order of an advance-angle control of the opening timing of the intake valve and a retard-angle control of the closing timing of the exhaust valve, based on a phase at which the trough of the exhaust pressure pulsation comes.

10. The control apparatus for the internal combustion engine according to claim 1, the apparatus further comprising:
pressure intersection information acquisition means for acquiring at least one crank angle of a crank angle at a first intersection where an exhaust pressure intersects with an intake pressure in such a way that the exhaust pressure falls below the intake pressure near an exhaust top dead center, and a crank angle at a second intersection where the exhaust pressure intersects with the intake pressure in such a way that the exhaust pressure exceeds the intake pressure at the exhaust top dead center,
wherein the valve overlap period setting means further includes valve opening/closing timing adjusting means for controlling the opening timing of the intake valve and/or the closing timing of the exhaust valve in such a way that the opening timing of the intake valve becomes the crank angle at the first intersection and/or in such a way that the closing timing of the exhaust valve becomes the crank angle at the second intersection.

11. The control apparatus for the internal combustion engine according to claim 1, the apparatus further comprising:
clogging determining means for determining degree of clogging of an exhaust gas purifying apparatus disposed in an exhaust passage; and
control changing means for, in accordance with the degree of clogging of the exhaust gas purifying apparatus determined by the clogging determining means, changing an opening degree control of the variable nozzle and a control of the valve overlap period after the judgment time point is passed.

12. The control apparatus for the internal combustion engine according to claim 11,
wherein the control changing means includes
low-clogging-case nozzle opening control execution means for, if the clogging determining means determines that the degree of clogging of the exhaust gas purifying apparatus is low, controlling the opening degree of the variable nozzle to be a second predetermined opening degree which is an opening side with respect to the first predetermined opening degree after the judgment time point is passed, and
low-clogging-case overlap period setting means for, if the clogging determining means determines that the degree of clogging of the exhaust gas purifying apparatus is low, setting the valve overlap period in such a way as to overlap with a timing at which trough of the exhaust pressure pulsation comes after the judgment time point is passed.

13. The control apparatus for the internal combustion engine according to claim 11, the apparatus further comprising:
exhaust system volume variable means which makes variable an exhaust system volume that is a volume obtained as a sum of an exhaust manifold volume and a space communicated therewith,
wherein, if the clogging determining means determines that the degree of clogging of the exhaust gas purifying apparatus is low, the exhaust system volume variable means reduces the exhaust system volume after the judgment time point is passed.

14. The control apparatus for the internal combustion engine according to claim 11,
wherein the request to enhance exhaust pressure pulsation is an acceleration request, and
wherein the control changing means includes high-clogging-case control means for controlling the opening degree of the variable nozzle and the valve overlap period in such a way that the control of the variable nozzle opening degree and valve overlap period is kept performed during acceleration, if the clogging determining means determines that the degree of clogging of the exhaust gas purifying apparatus is high.

15. The control apparatus for the internal combustion engine according to claim 14, the apparatus further comprising:
exhaust system volume variable means which makes variable an exhaust system volume that is a volume obtained as a sum of an exhaust manifold volume and a space communicated therewith,
wherein, if the clogging determining means determines that the degree of clogging of the exhaust gas purifying apparatus is high, the exhaust system volume variable means reduces the exhaust system volume after the judgment time point is passed.

16. A control apparatus for an internal combustion engine, the apparatus comprising:

a variable valve mechanism which makes variable a valve overlap period, in which an intake valve opening period overlaps with an exhaust valve opening period;

an overlap period control device for controlling the variable valve mechanism to control the valve overlap period;

a turbocharger which includes a turbine driven by exhaust energy of the internal combustion engine, and a variable nozzle for adjusting a flow rate of exhaust gas supplied to the turbine;

a nozzle opening degree control device for controlling an opening degree of the variable nozzle; and an acceleration request detecting device for detecting existence of nonexistence of an acceleration request, wherein the nozzle opening degree control device includes a nozzle closing control execution device for controlling the opening degree of the variable nozzle so as to be a first predetermined opening degree, which is on a closing side with respect to the opening degree of the variable nozzle at a detection time point at which the acceleration request is detected, for a duration from the detection time point to a judgment time point at which the exhaust pressure pulsation is judged to have been enhanced during acceleration, wherein the overlap period control device includes an overlap period restricting device for controlling the valve overlap period in such a way as to be shorten than the valve overlap period at the detection time point, for the duration from the detection time point to the judgment time point, wherein the nozzle opening degree control device further includes a nozzle opening control execution device for controlling the opening degree of the variable nozzle to be a second predetermined opening degree which is on an opening side with respect to the first predetermined opening degree, after the determination time point is passed, and wherein the overlap period control device further includes an overlap period setting device for setting the valve overlap period in such a way as to overlap with a timing at which trough of the exhaust pressure pulsation comes after the judgment time point is passed.

* * * * *